US012595398B2

(12) United States Patent
Kikuchi et al.

(10) Patent No.: US 12,595,398 B2
(45) Date of Patent: Apr. 7, 2026

(54) STICKY TAPE, ARTICLE, AND METHOD FOR DISASSEMBLING ARTICLE

(71) Applicant: DIC Corporation, Tokyo (JP)

(72) Inventors: Hiromasa Kikuchi, Saitama (JP); Hideaki Takei, Saitama (JP); Yusuke Takahashi, Tokyo (JP)

(73) Assignee: DIC Corporation, Tokyo (JP)

(*) Notice: Subject to any disclaimer, the term of this patent is extended or adjusted under 35 U.S.C. 154(b) by 171 days.

(21) Appl. No.: 18/407,702

(22) Filed: Jan. 9, 2024

(65) Prior Publication Data

US 2024/0158671 A1 May 16, 2024

Related U.S. Application Data

(63) Continuation of application No. PCT/JP2022/026897, filed on Jul. 7, 2022.

(30) Foreign Application Priority Data

Jul. 9, 2021 (JP) ................................ 2021-114339

(51) Int. Cl.
*C09J 7/35* (2018.01)

(52) U.S. Cl.
CPC ........... *C09J 7/35* (2018.01); *C09J 2301/124* (2020.08); *C09J 2301/304* (2020.08); *C09J 2301/312* (2020.08); *C09J 2301/502* (2020.08)

(58) Field of Classification Search
CPC .. C09J 7/35; C09J 2301/124; C09J 2301/304; C09J 2301/312; C09J 2301/502; C09J 2203/326; C09J 5/06; C09J 7/10; C09J 2301/208; C09J 2301/302; C09J 201/00;
(Continued)

(56) References Cited

U.S. PATENT DOCUMENTS

| | | | |
|---|---|---|---|
| 2010/0116807 A1 | 5/2010 | Yamanaka et al. | |
| 2018/0265750 A1* | 9/2018 | Akamatsu | C09J 5/00 |
| 2020/0406582 A1 | 12/2020 | Akamatsu et al. | |

FOREIGN PATENT DOCUMENTS

| | | |
|---|---|---|
| JP | 2002-188068 A | 7/2002 |
| JP | 2006-200279 A | 8/2006 |
| JP | 2010-118776 A | 5/2010 |

(Continued)

*Primary Examiner* — George R Koch
*Assistant Examiner* — Christopher C Caillouet
(74) *Attorney, Agent, or Firm* — Osha Bergman Watanabe & Burton LLP

(57) ABSTRACT

A sticky tape that can be heated and separated in a short time and can effectively prevent thermal damage to an adherend is provided. The sticky tape separable by heating, includes: an intermediate layer A containing a heating element and an adhesive agent; an adhesive agent layer B1 disposed on one surface side of the intermediate layer A and containing an adhesive agent; and an adhesive agent layer B2 disposed on the other surface side of the intermediate layer A and containing an adhesive agent. At least one of the adhesive agent layer B1 and the adhesive agent layer B2 is a heat-insulating layer C further having heat-insulating properties, or a heat-insulating layer C with heat-insulating properties is further provided at least one of between the intermediate layer A and the adhesive agent layer B1 and between the intermediate layer A and the adhesive agent layer B2.

16 Claims, 7 Drawing Sheets

(58) Field of Classification Search
CPC .. B32B 7/025; B32B 7/06; B32B 7/12; B32B 27/00; H05B 3/20
See application file for complete search history.

(56) References Cited

FOREIGN PATENT DOCUMENTS

| | | | |
|---|---|---|---|
| JP | 2015-160906 | A | 9/2015 |
| JP | 2016-108394 | A | 6/2016 |
| JP | 2017-195182 | A | 10/2017 |
| JP | 2017-222799 | A | 12/2017 |
| JP | 2019-156914 | A | 9/2019 |

* cited by examiner

FIG. 1D-a
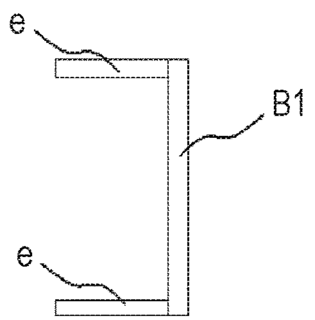
FIG. 1D-b
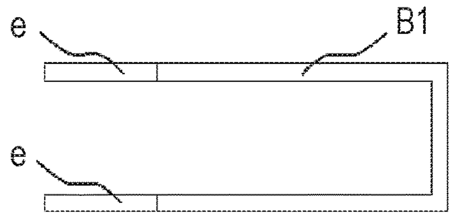
FIG. 1D-c
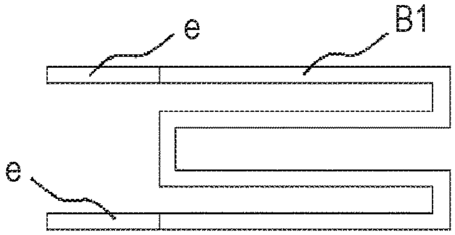
FIG. 1D-d
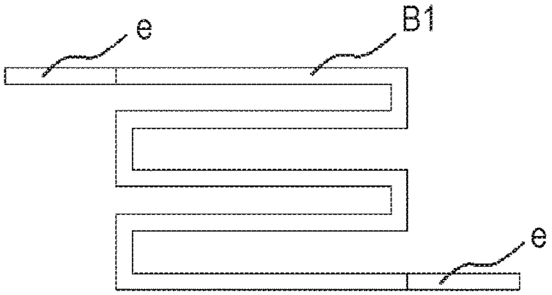
FIG. 1D-e
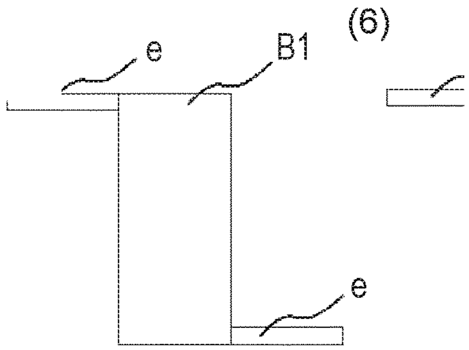
FIG. 1D-f
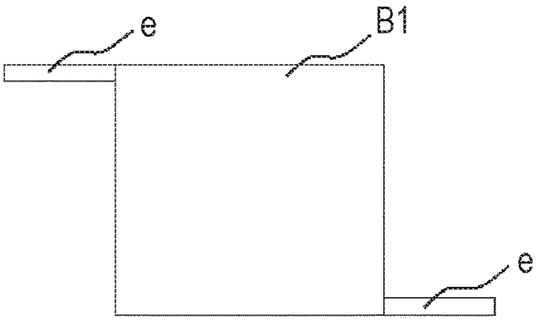

FIG. 1D-g
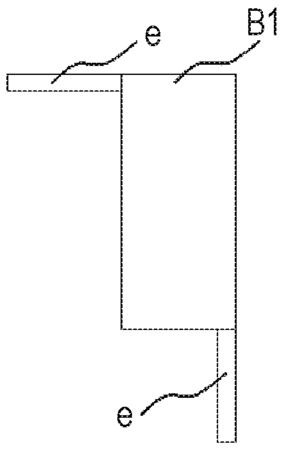
FIG. 1D-h
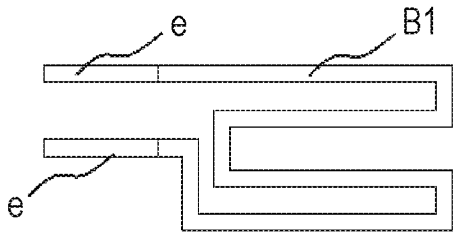
FIG. 1D-i
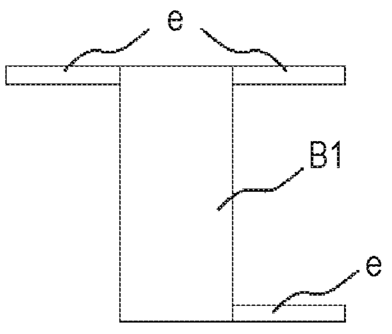

STICKY TAPE, ARTICLE, AND METHOD FOR DISASSEMBLING ARTICLE

TECHNICAL FIELD

One or more embodiments of the present invention relate to a sticky tape, an article, and a method for disassembling the article.

BACKGROUND

Sticky tapes are used as bonding means with high workability and high adhesion reliability, for example, for fixing components in industrial sectors, such as office automation (OA) equipment, IT products, home appliances, and automobiles, for temporarily fixing components, and for labels for displaying product information. In recent years, from the perspective of global environmental protection, there has been an increasing demand for recycling and reuse of used products in various industrial sectors, such as home appliances and automobiles. For recycling and reuse of various products, it is necessary to perform an operation of separating a sticky tape used for fixing a component or for a label. Sticky tapes are provided at various places in products, and it is therefore desired to reduce operating costs by a simple removal process.

To separate adherends from each other, for example, a hot-melt sticky agent composition that is rapidly melted in a short time by electromagnetic induction heating has been proposed (see, for example, Patent Literature 1). As a method for separating adherends from each other, a method for demolishing a building has been proposed in which a metallic base material is heated with an electromagnetic induction heating apparatus, and an adhesive agent between the base material and an interior material is heated, foamed, and removed to separate the interior material from the metallic base material (see, for example, Patent Literature 2). Furthermore, there has been proposed a double-sided adhesive tape with a thermally conductive layer that can be easily disassembled by bringing the tape into contact with a heat generation source to directly heat the thermally conductive layer (see, for example, Patent Literature 3).

PATENT LITERATURE

PTL 1: Japanese Unexamined Patent Application Publication No. 2002-188068

PTL 2: Japanese Unexamined Patent Application Publication No. 2006-200279

PTL 3: Japanese Unexamined Patent Application Publication No. 2016-108394

In a known method of separating and disassembling by heating, however, heat is applied from the outside, and to generate an amount of heat from a heating element to separate a sticky tape, the generated heat may cause thermal degradation or thermal damage to an adherend. On the other hand, to reduce thermal degradation or thermal damage to an adherend, a sticky tape is not sufficiently heated for separation due to a reduced amount of heat generation.

Thus, in a sticky tape for fixing adherends, such as rigid bodies, to each other, there is a demand for a sticky tape with a function of being disassembled to reuse an adhered component, and particularly there is a need for a sticky tape with a function of being easily disassembled and separated by heating.

SUMMARY

One or more embodiments of the present invention address known problems and achieve the followings. More specifically, one or more embodiments of the present invention provide a sticky tape that can be heated and separated in a short time and can effectively prevent thermal damage to an adherend, an article, and a method for disassembling the article.

One or more embodiments of the present invention are based on the above findings by the present inventors, and means for addressing the above are as follows:

<1> A sticky tape separable by heating, including: an intermediate layer A containing a heating element and an adhesive agent; an adhesive agent layer B1 disposed on one surface side of the intermediate layer A and containing an adhesive agent; and an adhesive agent layer B2 disposed on the other surface side of the intermediate layer A and containing an adhesive agent, wherein at least one of the adhesive agent layer B1 and the adhesive agent layer B2 is a heat-insulating layer C further having heat-insulating properties, or a heat-insulating layer C with heat-insulating properties is further provided at least one of between the intermediate layer A and the adhesive agent layer B1 and between the intermediate layer A and the adhesive agent layer B2.

<2> The sticky tape according to <1>, wherein the heat-insulating layer C is provided both between the intermediate layer A and the adhesive agent layer B1 and between the intermediate layer A and the adhesive agent layer B2.

<3> The sticky tape according to any one of <1> and <2>, wherein the heat-insulating layer C is selected from the group consisting of a foam layer, a hollow-containing layer, and a hollow-particle-containing layer.

<4> The sticky tape according to any one of <1> to <3>, wherein the heat-insulating layer C has a thickness in the range of 15 μm to 1,000 μm.

<5> The sticky tape according to any one of <1> to <4>, wherein the heating element has a volume resistivity of 30 μΩ·cm or more.

<6> The sticky tape according to <5>, wherein the heating element is selected from the group consisting of nichrome, stainless steel, titanium, nickel silver, and carbon.

<7> The sticky tape according to any one of <1> to <6>, wherein the intermediate layer A is a laminate including the heating element of a planar shape (planar-shaped heating element), and an adhesive agent layer a1 that is disposed on a first surface of the planar-shaped heating element and an adhesive agent layer a2 that is disposed on a second surface of the planar-shaped heating element.

<8> The sticky tape according to <7>, wherein the heating element of a planar shape has a pair of extended portions extending from an outer periphery of the adhesive agent layer a1 and the adhesive agent layer a2 in a plan view.

<9> The sticky tape according to any one of <7> and <8>, wherein at least one of the adhesive agent layer a1 and the adhesive agent layer a2 is softened or melted by heating.

<10> The sticky tape according to any one of <1> to <6>, wherein the intermediate layer A is composed of a single layer containing the heating element and the adhesive agent.

<11> The sticky tape according to any one of <1> to <10>, wherein the intermediate layer A is softened or melted by heating.

<12> The sticky tape according to any one of <1> to <11>, wherein a temperature at which an adhesive agent layer formed of the adhesive agent has a loss tangent (tan δ) of 0.45 or more is present in a temperature range of 80° C. or more and 200° C. or less.

<13> An article including: at least two adherends; and the sticky tape according to any one of <1> to <12> between two of the adherends, wherein two of the adherends are bonded together via the sticky tape.

<14> The article according to <13>, wherein the sticky tape has a pair of extended portions extending from an outer periphery of the adherend in a plan view.

<15> A method for disassembling the article according to <13> or <14>, including: softening or melting the intermediate layer A by heating of the heating element to separate two of the adherends.

<16> The method for disassembling the article according to <15>, wherein the heating of the heating element is resistance heating, and the intermediate layer A is electrically connected to a power supply, the heating element is energized from the power supply, and the intermediate layer A is softened or melted by resistance heating to separate two of the adherends.

One or more embodiments of the present invention can solve the known problems, can achieve the object, and can provide a sticky tape that can be heated and separated in a short time and can effectively prevent thermal damage to an adherend, an article, and a method for disassembling the article.

BRIEF DESCRIPTION OF THE DRAWINGS

FIGS. 1D-a to 1D-i are schematic plan views of examples of patterns of a heating element in a sticky tape according to one or more embodiments of the present invention.

DETAILED DESCRIPTION

Figure 1A:
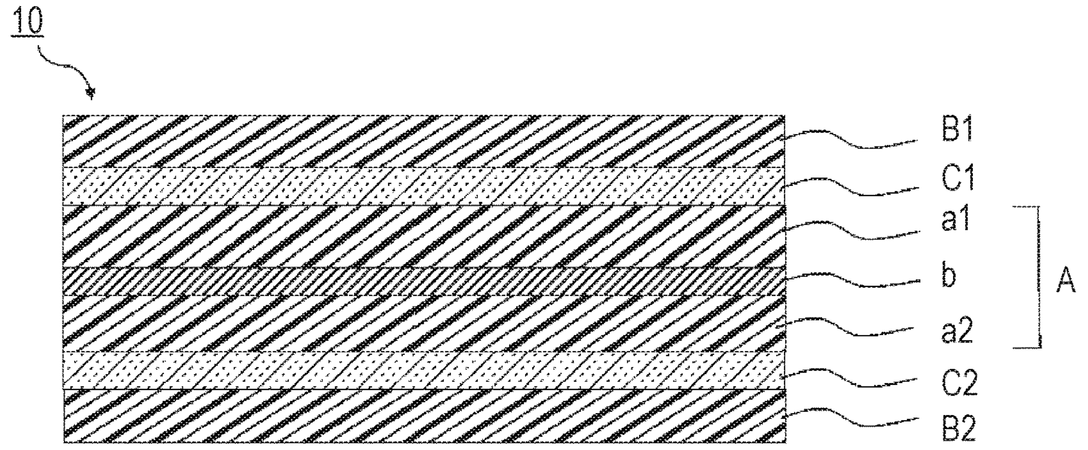
FIG. 1A is a schematic cross-sectional view of an example of a sticky tape according to one or more embodiments of the present invention.

The term “stickiness”, as used herein, refers to a type of adhesion, refers to adhesion by pressurization, and is also referred to as “pressure-sensitive adhesion”. Correspondingly, the term “sticky agent” refers to an adhesive agent that has both liquid and solid properties, has stickiness (tack), and exerts an adhesive action by pressurization, and is also referred to as a “pressure-sensitive adhesive agent”.

1. Sticky Tape

A sticky tape according to one or more embodiments of the present invention includes at least an intermediate layer A, an adhesive agent layer B1, an adhesive agent layer B2, and a heat-insulating layer C, and, if necessary, may further include another layer, such as a separation layer. A sticky tape according to one or more embodiments of the present invention is a sticky tape separable by heating.

A sticky tape according to one or more embodiments of the present invention can be used as an easy-to-disassemble sticky tape that is applied to adherends to fix the adherends together and, after a certain period, enables the fixation between the adherends to be easily disassembled. Thus, the intermediate layer A can be separated by heating, and bonded adherends can be disassembled.

As compared with a known method of separating and disassembling by heating, a sticky tape according to one or more embodiments of the present invention has a heat-insulating layer, and heat generated in the intermediate layer A is less likely to dissipate (thermal diffusion prevention). Thus, a sufficient amount of heat for heating and separating the intermediate layer A (in particular, melting or softening of an adhesive agent in the intermediate layer A) can be supplied. Furthermore, a sticky tape according to one or more embodiments of the present invention has a heat-insulating layer, and heat generated in the intermediate layer A is less likely to be transferred to an adherend, so that thermal degradation of the adherend can be reduced. In particular, when an electric current is directly applied to a heating element by resistance heating to heat an adhesive agent or a melt-softening layer near the heating element, even a small amount of energy can release the adhesive state in the intermediate layer A itself or at a desired position in the intermediate layer A and separate the intermediate layer A, and disassemble bonded adherends. Furthermore, when a sticky tape is thermally disassembled using a drive current in an electronic component in a state of being incorporated in an electronic device, it is possible to prevent thermal degradation or the like of a circuit in the component, and the sticky tape can be heated and separated without an external device or the like, which facilitates the disassembling work.

The phrase “A sticky tape according to the present invention “can be separated by heating”” may be one or more embodiments in which the sticky tape can be integrally separated from an adherend by heating, or may be one or more embodiments in which the sticky tape can be partially separated from an adherend by separation by heating in the sticky tape, particularly in the intermediate layer A or between the intermediate layer A and a layer adjacent to the intermediate layer A. When the sticky tape is separated by heating, the intermediate layer A may be integrally separated from an adherend or may be partially separated from the adherend.

<Intermediate Layer A>

The intermediate layer A contains at least a heating element and an adhesive agent and further contains another component as required. The intermediate layer A may be a single layer or may be composed of a plurality of layers. Furthermore, the intermediate layer A may be a layer having adhesiveness on both surfaces thereof or may be a layer having no adhesiveness on both surfaces thereof. The phrase "the intermediate layer A has adhesiveness on both surfaces thereof" means that both surfaces of the intermediate layer A may have pressure-sensitive adhesiveness, both surfaces of the intermediate layer A may have thermal adhesiveness, or one surface of the intermediate layer A may have pressure-sensitive adhesiveness and the other surface may have thermal adhesiveness. In particular, both surfaces of the intermediate layer A preferably have pressure-sensitive adhesiveness because the intermediate layer A can easily adhere at normal temperature to an adherend or another layer constituting a sticky tape according to one or more embodiments of the present invention and can firmly adhere thereto until heating.

<<Heating Element>>

The heating element can be appropriately selected from known heating elements without any limitation depending on the heating means to be used. The heating and the heating means can be appropriately selected from known heating means depending on the purpose without any limitation and are, for example, electromagnetic induction heating, infrared heating, microwave heating, heat conduction, resistance heating, or the like. Among these, resistance heating is preferred from the perspective that an adhesive agent (or a melt-softening layer) can be sufficiently softened or melted even with a small amount of energy; for example, a sticky tape can be thermally disassembled using a drive current in an electronic component in a state of being incorporated in an electronic device, and no need to heat a heating element using an external heat source via an adherend can prevent the adherend from being excessively heated.

The term "electromagnetic induction heating", as used herein, refers to a non-contact heating method as one type of electric heating method and is also referred to as high-frequency induction heating. When a resistive conductor (heating element) is placed in a magnetic field generated by passing a high-frequency current (an alternating current) through a coiled conducting wire, an electric current flows through the conductor due to the principle of electromagnetic induction, and the conductor is heated by Joule heat. The term "resistance heating" is an electric heating method and is a method of connecting a resistive conductor (heating element) to a power supply and passing an electric current through the conductor to heat the conductor by Joule heat. When an electric current is passed through a conductor, the amount of Joule heat generated in a certain period is proportional to the square of the electric current and the resistance of a conducting wire (Joule's law). A conductor has a resistance (volume resistivity or the like) specific to the material thereof.

The terms "infrared heating" and "microwave heating" refer to a non-contact heating method utilizing thermal energy generated by radiation using an electromagnetic wave in a specific wavelength region, such as infrared radiation or a microwave. A bond of atoms or a molecule constituting a substance has thermal vibration (molecular motion or crystal lattice vibration) corresponding to the temperature of the substance itself. When an electromagnetic wave with a wavelength corresponding to this frequency is absorbed, the vibration of the molecule is intensified and generates heat. The term "heat conduction" refers to a heating method using a heat transfer phenomenon in which heat is transferred from a high-temperature side to a low-temperature side inside a solid, and a heat generation source can be brought into direct contact with a thermally conductive substance to transfer heat.

When the heating means is resistance heating, the heating element is preferably a resistive conductor, and suitable examples thereof include a metal, a non-metal, and the like. The metal is, for example, nichrome (108 μΩ·cm); stainless steel, such as SUS 410 (62.2 μΩ·cm), SUS 304 (72.0 μΩ·cm), or SUS 430 (60.0 μΩ·cm); titanium (55.0 μΩ·cm); nickel silver (for example, "nickel silver C7701" manufactured by Takeuchi Metal Foil & Powder Co., Ltd., 34.0 μΩ·cm), or the like. The figures in parentheses indicate approximate values of the volume resistivity of each substance at 20° C. The non-metal is, for example, carbon (for example, 3,352 μΩ·cm), such as black lead (graphite), graphene, graphene oxide, a carbon nanomaterial, such as carbon nanotube, graphene platelet, or carbon nanofiber, or the like. Among these, nichrome, stainless steel, and the like are preferred from the perspective that they are not easily torn when formed into a metal foil, are easily handled as a tape, and can melt or soften an adhesive agent layer in a short time and greatly reduce the adhesive strength. Carbon is also preferred because, in addition to its high volume resistivity, carbon can be easily formed into a thin film and is less likely to impair physical properties, such as followability, required for a tape. In particular, a carbon nanomaterial, such as carbon nanotube, is preferred because it easily exhibits electrical conductivity even in a small amount due to its rod-like shape and can melt or soften the adhesive agent layer A by resistance heating in a short time.

When the heating means is resistance heating, the heating element preferably has a volume resistivity of 30 μΩ·cm or more, more preferably 50 μΩ·cm or more, still more preferably 70 μΩ·cm or more, particularly preferably 100 μΩ·cm or more, at normal temperature (20° C.). The volume resistivity of the heating element may have any upper limit and is preferably 100,000 μΩ·cm or less, more preferably 20,000 μΩ·cm or less, still more preferably 10,000 μΩ·cm or less, particularly preferably 5,000 μΩ·cm or less, because an excessively high volume resistivity requires a high voltage at the time of energization. More specifically, the heating element may have a volume resistivity in the range of 30 μΩ·cm to 100,000 μΩ·cm, 50 μΩ·cm to 20,000 μΩ·cm, 70 μΩ·cm to 10,000 μΩ·cm, or 100 μΩ·cm to 5,000 μΩ·cm. The heating element with a volume resistivity of 30 μΩ·cm or more connected to a wiring circuit in an electronic device to apply a drive current of the electronic device to the heating element at the time of disassembling an article by resistance heating can heat only the sticky tape and prevent the wiring circuit from being degraded at high temperature. In this case, the heating element preferably has higher volume resistivity than the wiring circuit in the electronic device.

The volume resistivity of the heating element can be measured with a low resistivity meter (trade name: "Loresta-AX MCP-T370", manufactured by Nittoseiko Analytech Co., Ltd.) and a four-point probe (trade name: "ASP probe MCP-TP03P", manufactured by Nittoseiko Analytech Co., Ltd.) in a 20° C. environment in accordance with JIS K 7194. The number of measurement points is one, and the resistivity correction factor is 4.532.

When the heating means is electromagnetic induction heating, the heating element is preferably a resistive conductor, and suitable examples thereof include iron, aluminum, nickel, stainless steel, zinc, lead, magnesium, and a metal oxide or an alloy thereof. Among these, aluminum and iron are more preferred.

When the heating means is infrared heating or microwave heating, the heating element is preferably a substance with a property of absorbing a specific wavelength of infrared heating or microwave heating and thermally vibrating (generating heat), for example, an organic substance, an inorganic substance, or the like. The organic substance is, for example, a resin, a rubber, a fiber, an organic colorant, an organic dye, an organic pigment, or the like. The organic substance is preferably a component of an adhesive agent in the intermediate layer A. The inorganic substance may be any substance that generates heat by receiving infrared heating or a microwave, for example, a metal inorganic substance, a non-metal inorganic substance, an inorganic colorant, an inorganic dye, an inorganic pigment, or the like. The metal inorganic substance is, for example, a nonferrous metal, such as aluminum, titanium, chromium, manganese, cobalt, nickel, magnesium, zinc, or copper; iron; an oxide of at least one of the nonferrous metal and iron, or the like. The non-metal inorganic substance is, for example, silicon, carbon; an oxide, such as silica (for example, $SiO_2$), or the like.

When the heating means is heat conduction, the heating element is preferably a thermally conductive substance, for example, a metal, a non-metal, or the like. The metal is, for example, aluminum, iron, copper, an oxide or nitride of the metal, or the like. The non-metal is, for example, ceramic, such as silicon carbide, graphite, or the like.

When the heating means is resistance heating, provided that the heating elements are in electrical contact with each other for resistance heating, the shape of the heating element can be appropriately selected depending on the purpose without any limitation and is, for example, planar, mesh-like, particulate, fibrous, or the like. Among these, the planar shape is preferred because the heating element can sufficiently adhere to another layer in contact with the heating element before energization and because the heating element generates heat on the plane at the time of energization and is less likely to be broken or disconnected at the time of energization and disassembly. A planar heating element is, for example, a metal foil made of the metal, a sheet of the non-metal, a resin sheet in which particles or fibers made of the metal or the non-metal are densely dispersed, a coating film of the metal or the non-metal, a sheet of a non-woven fabric impregnated with the metal or the non-metal, a non-woven fabric of the metal or the non-metal, or the like. Among these planar heating elements, a metal foil, a non-metal sheet, a metal or non-metal coating film, or a metal or non-metal non-woven fabric is preferred, and a metal foil is more preferred, because the entire surface can be heated due to high volume resistivity and disconnection is less likely to occur.

A planar heating element may cover the entire surface of an adhesive agent layer or may cover a portion of an adhesive agent layer in a plan view of a sticky tape. Furthermore, a planar heating element may be formed in a pattern shape or may be belt-like or linear. A belt-like or linear heating element is advantageous in terms of high heating efficiency and easy separation due to a small contact area with an adherend. In this case, the length (bandwidth or linewidth) of the heating element in a short axis direction preferably ranges from 0.5 mm to 20 mm, more preferably 1 mm to 10 mm, still more preferably 2 mm to 5 mm.

A planar heating element in a pattern (with a pattern shape) can have an increased distance between terminals (terminals for connection to a power supply) of the heating element and have increased resistance. This can increase the heating efficiency of the planar heating element and separate a sticky tape according to one or more embodiments of the present invention in a short time. A planar heating element in a pattern may have any pattern linewidth, which may be in the preferred range of the bandwidth or the linewidth.

In a planar heating element, the heating element may be disposed on one or both surfaces of a substrate. When the heating element is disposed on one or both surfaces of a substrate, the heating element may be disposed to cover the entire region of one or both surfaces of the substrate or may be disposed in a linear shape, a belt-like shape, or a pattern shape. In one or more embodiments in which a planar heating element is disposed on one or both surfaces of a substrate, the heating element is disposed to be in direct contact with one or both surfaces of the substrate. The substrate may be any substrate that can support a heating element and is preferably a resin film from the perspective of the followability of a sticky tape, a decrease in the thickness of the film, or the like. The resin film may be a general-purpose film, for example, a polyester resin film, such as a poly(ethylene terephthalate) (PET) film or poly (ethylene naphthalate) (PEN), an imide resin film, such as a polyimide (PI) film, a polyolefin resin film, such as a polypropylene (PP) film, or the like. It may also be a resin film used for a melt-softening layer described later.

A mesh-like heating element is, for example, an integrally formed heating element, such as a planar heating element with a plurality of through-holes or a reticulate or grid-like heating element.

The heating elements can be in electrical contact with each other even if the heating elements are not integrally formed, and may be, for example, a particle or fiber made of the metal or the non-metal. Particulate or fibrous heating elements may be dispersed in an adhesive agent to form electrical contact between the heating elements even if the heating elements are not integrally formed. When particles or fibers made of a heating element are dispersed in an adhesive agent, provided that electrical contact between the heating elements is formed, the particle or fiber content can be appropriately selected depending on the purpose without any limitation and preferably ranges from 20% by mass to 95% by mass, more preferably 40% by mass to 90% by mass, of the total amount of the adhesive agent. When the intermediate layer A is a single layer formed of an adhesive agent and the single layer contains a heating element, the particle or fiber content can be the content relative to the total amount of the intermediate layer A. When the intermediate layer A is a laminate and one of the layers constituting the laminate has an adhesive agent layer a in which particles or fibers of the heating element are dispersed, the particle or fiber content can be the content relative to the total amount of one adhesive agent layer a.

The average thickness of the planar heating element can be appropriately selected depending on the purpose without any limitation and preferably ranges from 1 μm to 200 μm, preferably 2 μm to 200 μm, preferably 3 μm to 150 μm, more preferably 5 μm to 150 μm, preferably 5 μm to 100 μm, more preferably 10 μm to 100 μm, preferably 10 μm to 50 μm. The average thickness of a planar heating element is an average value obtained by measuring the thickness at five or more arbitrarily selected positions. Although the amount of electric current and the amount of heat generation increase with the average thickness of the planar heating element, the thickness is limited from the perspective of the followability and application workability of the sticky tape. A planar heating element with an average thickness in the above range, however, can have a sufficient amount of electric current and a sufficient amount of heat generation, can be efficiently heated by resistance heating, and can provide the sticky tape with high followability and application workability.

The average thickness of the planar heating element refers to the thickness excluding the resin film when the heating element is disposed on one or both surfaces of the substrate or the thickness of the heating element on each surface when the heating element is formed on both surfaces of the resin film.

The heating element may be a heating element appropriately produced or a commercially available heating element.

The commercially available product can be appropriately selected depending on the purpose without any limitation and is, for example, a planar heating element, including nichrome foil, such as nichrome NCH1-H; stainless steel foil, such as stainless steel SUS304-H or stainless steel SUS430-H; titanium foil, such as titanium type 1 TR270C-H; nickel silver, such as nickel silver C7701 (all of which are manufactured by Takeuchi Metal Foil & Powder Co., Ltd.), or the like. Those obtained by pattern-forming these products can also be used.

When the heating means is electromagnetic induction heating or heat conduction, the shape of the heating element can be appropriately selected depending on the purpose without any limitation and is, for example, planar, mesh-like, or particles or fibers made of the heating element dispersed in an adhesive agent. When the heating means is electromagnetic induction heating and heat conduction, the planar heating element may cover the entire surface of the adhesive agent layer or may cover a portion of the adhesive agent layer. It may also be formed in a pattern shape or may be belt-like or linear. A belt-like or linear heating element is advantageous in terms of high heating efficiency and easy separation due to a small contact area with an adherend. In this case, the length (bandwidth or linewidth) of the heating element in a short axis direction preferably ranges from 1 mm to 10 mm, more preferably 2 mm to 5 mm. The average thickness of the planar heating element can be appropriately selected depending on the purpose without any limitation and preferably ranges from 5 μm to 200 μm, more preferably 10 μm to 150 μm, still more preferably 12 μm to 100 μm.

When the heating means is infrared heating or microwave heating, the heating element is preferably dispersed in the adhesive agent or in a melt-softening layer described later and is more preferably a component of the adhesive agent in the intermediate layer A. When the heating means is infrared heating, a pigment or the like can be used as an infrared absorbing material, which may be dispersed in an adhesive agent or a resin or may be applied as a thin film in the intermediate layer A, which is a laminate.

<<Adhesive Agent>>

The adhesive agent can be appropriately selected depending on the purpose without any limitation and is preferably at least one of a pressure-sensitive adhesive agent and a hot-melt adhesive agent. When the adhesive agent contained in the intermediate layer A is a hot-melt adhesive agent or a pressure-sensitive adhesive agent containing a thermoplastic resin, the resin can be melted or softened by heat, and the adhesive agent layer A can advantageously be separated without mixing a component that forms a separation starting point at an adhesive interface or a component that causes a decrease in adhesive strength, such as a heat foaming agent.

The adhesive agent preferably has a softening point, which is advantageous in that the adhesive agent is rapidly softened and exhibits high deformability and fluidity at a temperature higher than the softening point.

Due to melting or softening of the resin by heating, the adhesive strength of the adhesive agent during heating becomes lower than the adhesive strength at normal temperature.

The storage modulus $G_{23}$ of the adhesive agent (an adhesive agent layer formed of the adhesive agent) measured in a dynamic viscoelastic spectrum at 1 Hz and 23° C. preferably ranges from $1.0\times10^3$ Pa to $1.0\times10^9$ Pa, particularly preferably $1.0\times10^3$ Pa to $5.0\times10^7$ Pa, more preferably $5.0\times10^3$ Pa to $5.0\times10^7$ Pa, still more preferably $5.0\times10^3$ Pa to $5.0\times10^6$ Pa, particularly preferably $5.0\times10^3$ Pa to $1.0\times10^6$ Pa, from the perspective of satisfactorily fixing adherends to each other in a normal state.

In particular, when the adhesive agent is a pressure-sensitive adhesive agent (a sticky agent), the storage modulus $G_{23}$ of the pressure-sensitive adhesive agent (a pressure-sensitive adhesive agent layer) measured in a dynamic viscoelastic spectrum at 1 Hz and 23° C. preferably ranges from, among the ranges of the storage modulus $G_{23}$ described above, $1.0\times10^3$ Pa to $5.0\times10^7$ Pa, more preferably $5.0\times10^3$ Pa to $5.0\times10^6$ Pa, still more preferably $5.0\times10^3$ Pa to $1.0\times10^6$ Pa, from the perspective of satisfactorily fixing adherends to each other in a normal state (a non-heated state).

When the adhesive agent is a hot-melt adhesive agent, the storage modulus $G_{23}$ of the hot-melt adhesive agent (a hot-melt adhesive agent layer) measured in a dynamic viscoelastic spectrum at 1 Hz and 23° C. preferably ranges from $1.0\times10^3$ Pa to $1.0\times10^9$ Pa, more preferably $5.0\times10^3$ Pa to $5.0\times10^8$ Pa, still more preferably $1.0\times10^4$ Pa to $1.0\times10^8$ Pa, from the perspective of satisfactorily fixing adherends to each other in a normal state (a non-heated state).

The storage modulus $G_{100}$ of the adhesive agent (an adhesive agent layer formed of the adhesive agent) measured in a dynamic viscoelastic spectrum at 1 Hz and 100° C. preferably ranges from $1.0\times10^0$ Pa to $5.0\times10^6$ Pa, more preferably $1.0\times10^3$ Pa to $1.0\times10^6$ Pa, still more preferably $5.0\times10^3$ Pa to $5.0\times10^5$ Pa, from the perspective of easily separating adherends from each other by heating.

In particular, when the adhesive agent is a pressure-sensitive adhesive agent (a sticky agent), the storage modulus $G_{100}$ of the pressure-sensitive adhesive agent (a pressure-sensitive adhesive agent layer) measured in a dynamic viscoelastic spectrum at 1 Hz and 100° C. preferably ranges from, among the ranges of the storage modulus $G_{100}$ described above, $1.0\times10^2$ Pa to $5.0\times10^6$ Pa, more preferably $1.0\times10^3$ Pa to $1.0\times10^6$ Pa, still more preferably $5.0\times10^3$ Pa to $5.0\times10^5$ Pa. This is because the pressure-sensitive adhesive agent (a pressure-sensitive adhesive agent layer) with a storage modulus $G_{100}$ in the above range can be melted or softened by heating to be separable in a short time.

When the adhesive agent is a pressure-sensitive adhesive agent, the storage modulus $G_{23}$ and the storage modulus $G_{100}$ can be measured by the following method. In a viscoelastometer (ARES-G2, manufactured by TA Instruments Japan), a test specimen was placed between parallel disks with a diameter of 8 mm, which are measurement portions of the viscoelastometer, and the storage modulus G' was measured as values at 23° C. and 100° C. at a frequency of 1 Hz in the temperature range of −40° C. to 200° C. at a heating rate of 2° C./min. In the test specimen, a pressure-sensitive adhesive agent was applied with an applicator to a dry thickness of approximately 2 mm, was dried, and was aged as required to form a pressure-sensitive adhesive agent layer (a sticky agent layer).

When the adhesive agent is a hot-melt adhesive agent, the storage modulus $G_{23}$ and the storage modulus $G_{100}$ are measured as values at 23° C. and 100° C. by placing a test specimen between tensile jigs, which are measurement portions of a viscoelastometer, and measuring the storage modulus G' at a frequency of 1 Hz in the temperature range of −40° C. to 200° C. at a heating rate of 2° C./min. In the test specimen, a hot-melt adhesive agent was applied with an applicator to a dry thickness of approximately 0.1 mm and was dried to form a hot-melt adhesive agent layer.

The temperature at which the loss tangent (tan δ) of the adhesive agent (an adhesive agent layer formed of the adhesive agent) is 0.45 or more is preferably in the temperature range of 80° C. or more and 200° C. or less. More preferably, the temperature at which the tan δ is 0.8 or more is in the temperature range of 80° C. or more and 200° C. or less. Still more preferably, the temperature at which the tan δ is 1.0 or more is in the temperature range of 80° C. or more and 200° C. or less.

When the temperature at which the tan δ of the adhesive agent (an adhesive agent layer formed of the adhesive agent) is a predetermined value or more is present in the temperature range of 80° C. or more and 200° C. or less, this is advantageous in that when the adhesive agent reaches that temperature by receiving heat from the heating element, plastic deformation occurs easily due to melting or softening, and separating and disassembling occur easily in a shorter time due to cohesive failure in the layer formed of the adhesive agent. As described later, when the intermediate layer A has an adhesive agent layer a1 and an adhesive agent layer a2, in at least one of the adhesive agent layers a1 and a2, the temperature at which the loss tangent (tan δ) is 0.45 or more is preferably in the temperature range of 80° C. or more and 200° C. or less.

The loss tangent (tan δ) is determined from the storage modulus (G') and the loss modulus (G") obtained by dynamic viscoelastic measurement by temperature dispersion using the equation $\tan\delta = G''/G'$. The dynamic viscoelastic measurement is the same as the method for measuring the storage modulus $G_{23}$ and the storage modulus $G_{100}$ described above.

The storage modulus $G_{23}$, the storage modulus $G_{100}$, and the loss tangent (tan δ) of an adhesive agent (an adhesive agent layer) can be adjusted by adjusting the types and combination of monomers constituting a resin (a base polymer) serving as a main component of the adhesive agent, the blend ratio of the monomers, the amount of tackifier resin added as required, the amount of cross-linker added as required (the gel fraction of the adhesive agent), or the like. The resin (base polymer) serving as a main component of the adhesive agent may be used alone or in combination of two or more thereof. The resin serving as a main component of the adhesive agent will be described later in the section of "—Resin—". Furthermore, when the adhesive agent layer contains a heating element, the storage modulus $G_{23}$, the storage modulus $G_{100}$, and the loss tangent (tan δ) of the adhesive agent (adhesive agent layer) are values of the adhesive agent (the adhesive agent layer) excluding the heating element.

The adhesive agent preferably has a melting point of 70° C. or more and 150° C. or less, more preferably 75° C. or more and 130° C. or less, still more preferably 80° C. or more and 110° C. or less. This is because the adhesive agent with a melting point in such a range can have high adhesive strength before heating and can be easily melted or softened even by a small amount of heating. The melting point of the adhesive agent can be adjusted by selecting the type of resin serving as a main component of the adhesive agent, the tackifier resin content of the adhesive agent, the gel fraction, or the like. The melting point of the adhesive agent may be the temperature of an endothermic peak associated with melting measured by differential scanning calorimetry (DSC).

<<<Pressure-Sensitive Adhesive Agent>>>

The pressure-sensitive adhesive agent is an adhesive agent that adheres by applying pressure at normal temperature for a short time. A pressure-sensitive adhesive agent is referred to as a sticky agent. The pressure-sensitive adhesive agent has tackiness at normal temperature. The pressure-sensitive adhesive agent can be appropriately selected from known pressure-sensitive adhesive agents depending on the purpose without any limitation and is, for example, an acrylic pressure-sensitive adhesive agent (an acrylic sticky agent), a urethane pressure-sensitive adhesive agent (a urethane sticky agent), a rubber pressure-sensitive adhesive agent (a rubber sticky agent), such as a synthetic rubber pressure-sensitive adhesive agent or a natural rubber pressure-sensitive adhesive agent, a silicone pressure-sensitive adhesive agent (a silicone sticky agent), or the like.

The pressure-sensitive adhesive agent may contain a thermoplastic resin or may contain no thermoplastic resin but contain a resin without thermoplasticity. When the pressure-sensitive adhesive agent contains a thermoplastic resin, the pressure-sensitive adhesive agent can be melted or softened by heating and have reduced adhesive strength, and the intermediate layer A can be separated. In the pressure-sensitive adhesive agent containing no thermoplastic resin but containing a resin without thermoplasticity, when used in combination with at least one of the hot-melt adhesive agent and a melt-softening layer, the hot-melt adhesive agent or the melt-softening layer can be melted by heating, and the intermediate layer A can be separated.

The acrylic pressure-sensitive adhesive agent contains an acrylic resin and, if necessary, further contains another component, such as a tackifier resin, a cross-linker, or an antioxidant. The urethane pressure-sensitive adhesive agent contains a urethane resin and, if necessary, further contains another component, such as a tackifier resin, a cross-linker, or an antioxidant. The rubber pressure-sensitive adhesive agent contains a rubber material, such as a styrene resin, and, if necessary, further contains another component, such as a tackifier resin, a cross-linker, or an antioxidant. The silicone pressure-sensitive adhesive agent contains a silicone resin and, if necessary, further contains another component, such as a tackifier resin, a cross-linker, or an antioxidant.

<<<Hot-Melt Adhesive Agent>>>

The hot-melt adhesive agent is a thermoplastic adhesive agent that is solid at normal temperature, is liquefied by heating and melting, is applied to an adherend, and forms a bond by cooling and solidification. The hot-melt adhesive agent can be dissolved in a solvent, applied, dried and solidified to form a film, and heated at the time of bonding to an adherend to form a bonding state. The hot-melt adhesive agent usually does not have tackiness at normal temperature or has lower tackiness than a pressure-sensitive adhesive agent. The hot-melt adhesive agent contains a thermoplastic resin and, if necessary, further contains another component, such as a tackifier resin, a cross-linker, or an antioxidant.

The hot-melt adhesive agent is, for example, an ethylene-vinyl acetate copolymer (EVA) hot-melt adhesive agent, a polyolefin hot-melt adhesive agent, a polyamide hot-melt adhesive agent, a polyurethane hot-melt adhesive agent, an acrylic hot-melt adhesive agent, a polyester hot-melt adhesive agent, a rubber hot-melt adhesive agent based on a styrene thermoplastic elastomer, or the like.

—Resin—

A resin (base polymer) usable as a main component of the pressure-sensitive adhesive agent and the hot-melt adhesive agent is, for example, a urethane resin, such as polyurethane (PU) or a thermoplastic polyurethane (TPU); polycarbonate (PC); a poly(vinyl chloride) resin, such as poly(vinyl chloride) (PVC) or a vinyl chloride-vinyl acetate copolymer resin; an acrylic resin, such as poly(acrylic acid), poly(methacrylic acid), poly(methyl acrylate), poly(methyl methacrylate) (PMMA), poly(ethyl methacrylate), or an acrylic polymer produced by polymerization of one or two or more (meth)acrylic monomers; a polyester resin, such as poly(ethylene terephthalate) (PET), poly(butylene terephthalate), poly(trimethylene terephthalate), poly(ethylene naphthalate), or poly(butylene naphthalate); a polyamide resin, such as nylon (registered trademark); a polystyrene resin, such as polystyrene (PS), imide-modified polystyrene, an acrylonitrile·butadiene·styrene (ABS) resin, an imide-modified ABS resin, a styrene·acrylonitrile copolymer (SAN) resin, or an acrylonitrile·ethylene-propylene-dien·styrene (AES) resin; an olefin resin, such as a polyethylene (PE) resin, a polypropylene (PP) resin, or a cycloolefin resin; a cellulose resin, such as nitrocellulose or cellulose acetate; a silicone resin; a thermoplastic resin, such as a fluoropolymer, a thermoplastic elastomer, such as a styrene thermoplastic elastomer, an olefin thermoplastic elastomer, a vinyl chloride thermoplastic elastomer, an acrylic thermoplastic elastomer, a urethane thermoplastic elastomer, an ester thermoplastic elastomer, or an amide thermoplastic elastomer, or the like. These may be used alone or in combination.

Among these, a thermoplastic resin is preferred, an acrylic resin, a urethane resin, a polyester resin, or a thermoplastic elastomer, such as a styrene thermoplastic elastomer, an olefin thermoplastic elastomer, a vinyl chloride thermoplastic elastomer, an acrylic thermoplastic elastomer, an ester thermoplastic elastomer, a urethane thermoplastic elastomer, or an amide thermoplastic elastomer is more preferred, and a styrene thermoplastic elastomer is particularly preferred.

The styrene thermoplastic elastomer is, for example, a styrene AB-type diblock copolymer, such as a styrene-ethylene-butylene copolymer (SEB); a styrene ABA-type triblock copolymer, such as a styrene-butadiene-styrene copolymer (SBS), a hydrogenated product of SBS (a styrene-ethylene-butylene-styrene copolymer (SEBS)), a styrene-isoprene-styrene copolymer (SIS), a hydrogenated product of SIS (a styrene-ethylene-propylene-styrene copolymer (SEPS)), or a styrene-isobutylene-styrene copolymer (SIBS); a styrene ABAB-type tetrablock copolymer, such as styrene-butadiene-styrene-butadiene (SBSB); a styrene ABABA-type pentablock copolymer, such as styrene-butadiene-styrene-butadiene-styrene (SBSBS); a styrene multiblock copolymer with AB repeating units higher than those described above; a hydrogenated product produced by hydrogenating an ethylenic double bond of a styrene random copolymer, such as styrene-butadiene rubber (SBR), or the like. These may be used alone or in combination. The styrene thermoplastic elastomer may be a commercially available product.

The thermoplastic elastomer preferably has a weight-average molecular weight in the range of 10,000 to 800,000, more preferably 30,000 to 500,000, still more preferably 50,000 to 300,000. In the above ranges, the storage modulus and loss tangent of the adhesive agent (adhesive agent layer) are easily adjusted within a desired range, and the adhesive agent is easily melted or softened by heating. The method for measuring the weight-average molecular weight can be the same as the method for measuring the weight-average molecular weight of an acrylic polymer described later.

The thermoplastic elastomer may be one or two or more triblock copolymers, may be one or two or more diblock copolymers, or may be a mixture of a triblock copolymer and a diblock copolymer. In particular, the thermoplastic elastomer preferably contains at least a diblock copolymer because the adhesive agent has an appropriate cohesive force, has high adhesive strength at normal temperature before heating, and can be easily melted or softened by heating. The diblock copolymer content of the thermoplastic elastomer is preferably in the range of 10% by mass to 100% by mass, particularly preferably in the range of 10% by mass to 90% by mass, more preferably in the range of 15% by mass to 80% by mass, still more preferably in the range of 20% by mass to 75% by mass, due to a good balance between the adhesiveness at normal temperature and the melting or softening properties by heating.

A thermoplastic resin as a main component of the adhesive agent is preferably a polyester resin. It may be a crystalline polyester resin or an amorphous polyester resin.

A thermoplastic resin as a main component of the adhesive agent is preferably an acrylic resin. The acrylic resin may be an acrylic polymerization product (an acrylic polymer) produced by polymerizing a monomer component containing a (meth)acrylate monomer. The acrylic polymer may be a homopolymer of a (meth)acrylate monomer or may be a copolymer of a (meth)acrylate monomer and another monomer. Among these, a copolymer is preferred. The term "(meth)acrylic" means acrylic or methacrylic. The term "(meth)acrylate" means acrylate or methacrylate.

A (meth)acrylate monomer constituting the acrylic polymer is, for example, a (meth)acrylate monomer with 1 to 14 carbon atoms, such as methyl (meth)acrylate, ethyl (meth)acrylate, n-propyl (meth)acrylate, isopropyl (meth)acrylate, n-butyl (meth)acrylate, sec-butyl (meth)acrylate, t-butyl (meth)acrylate, isobutyl (meth)acrylate, n-hexyl (meth)acrylate, cyclohexyl (meth)acrylate, n-octyl (meth)acrylate, isooctyl (meth)acrylate, 2-ethylhexyl (meth)acrylate, isononyl (meth)acrylate, isodecyl (meth)acrylate, or lauryl (meth)acrylate.

Among these, it is preferred to contain an alkyl (meth)acrylate monomer with an alkyl chain with 1 to 9 carbon atoms, more preferably an alkyl (meth)acrylate monomer with an alkyl chain with 2 to 9 carbon atoms, still more preferably an alkyl (meth)acrylate monomer with an alkyl chain with 4 to 9 carbon atoms because the storage modulus and loss tangent of the adhesive agent (adhesive agent layer) can be easily adjusted within a desired range, more preferably an alkyl acrylate monomer with an alkyl chain with 4 to 9 carbon atoms. The alkyl acrylate monomer with an alkyl chain with 4 to 9 carbon atoms may be n-butyl acrylate, isooctyl acrylate, 2-ethylhexyl acrylate, isononyl acrylate, or the like. The acrylic polymer preferably contains one or two or more selected from the group consisting of these.

The (meth)acrylate monomer content is preferably in the range of 70% to 99.9% by mass, more preferably in the range of 80% to 99% by mass, still more preferably in the range of 90% to 97% by mass, based on the total amount of the monomer components constituting the acrylic polymer because the storage modulus and loss tangent of the adhesive agent (adhesive agent layer) can be easily adjusted within a desired range.

The acrylic polymer preferably contains, as a (meth) acrylic monomer, a (meth)acrylic monomer with a polar group as a constitutional unit, in addition to the (meth) acrylate monomer described above. The polar group is, for example, a hydroxy group, a carboxy group, an amide group, or a polar group other than these groups.

The (meth)acrylic monomer with a hydroxy group is, for example, 2-hydroxyethyl (meth)acrylate, 4-hydroxybutyl (meth)acrylate, 6-hydroxyhexyl (meth)acrylate, hydroxypropyl (meth)acrylate, caprolactone-modified (meth)acrylate, poly(ethylene glycol) mono(meth)acrylate, poly(propylene glycol mono(meth)acrylate, or the like. Among these, 2-hydroxyethyl (meth)acrylate, 4-hydroxybutyl (meth)acrylate, or 6-hydroxyhexyl (meth)acrylate is preferably used.

The (meth)acrylic monomer with a carboxy group is, for example, acrylic acid, methacrylic acid, itaconic acid, maleic acid, crotonic acid, a dimer of acrylic acid or methacrylic acid, ethylene-oxide-modified succinic acid acrylate, or the like. Among these, acrylic acid is preferably used.

The (meth)acrylic monomer with an amide group is, for example, N-vinyl-2-pyrrolidone, N-vinylcaprolactam, acryloylmorpholine, acrylamide, N,N-dimethylacrylamide, 2-(perhydrophthalimid-N-yl)ethyl acrylate, or the like. Among these, N-vinyl-2-pyrrolidone, N-vinylcaprolactam, or acryloylmorpholine is preferably used.

The vinyl monomer with another polar group is, for example, vinyl acetate, acrylonitrile, maleic anhydride, itaconic anhydride, or the like.

Among the (meth)acrylic monomers with a polar group, at least one of a (meth)acrylic monomer with a hydroxy group and a (meth)acrylic monomer with a carboxy group is preferably contained. This is because when a cross-linker described later is used in combination, a cross-linked structure can be formed between a hydroxy group or a carboxy group and the cross-linker, and the storage modulus of the adhesive agent (adhesive agent layer) can be adjusted.

The amount of the (meth)acrylic monomer with a polar group is preferably in the range of 0.1% by mass to 20% by mass, preferably in the range of 1% by mass to 13% by mass, more preferably in the range of 1.5% by mass to 8% by mass, based on the total amount of the monomer components constituting the acrylic polymer because the storage modulus and loss tangent of the adhesive agent (adhesive agent layer) can be easily adjusted within a desired range.

The acrylic polymer preferably has a weight-average molecular weight in the range of 400,000 to 1,400,000, more preferably 600,000 to 1,200,000, preferably 650,000 to 1,100,000, because the storage modulus and loss tangent of the adhesive agent (adhesive agent layer) can be easily adjusted within a desired range.

The weight-average molecular weight can be measured with a gel permeation chromatograph (GPC). More specifically, it can be measured with a GPC measuring apparatus "SC8020" manufactured by Tosoh Corporation in terms of polystyrene under the following GPC measurement conditions.

(GPC Measurement Conditions)

Sample concentration: 0.5% by mass (tetrahydrofuran solution)

Sample injection volume: 100 μL

Eluent: tetrahydrofuran (THF)

Flow rate: 1.0 mL/min

Column temperature (measurement temperature): 40° C.

Column: "TSKgel GMHHR-H" manufactured by Tosoh Corporation

Detector: differential refraction

The amount of resin as a main component of the adhesive agent is preferably 50% by mass or more, particularly preferably 70% by mass or more, more preferably 90% by mass or more, still more preferably 98% by mass or more, still more preferably 99% by mass or more, per 100% by mass of the total solid content of the adhesive agent. When the adhesive agent contains the heating element, it means a content ratio to the total solid content of the adhesive agent excluding the heating element content.

When the adhesive agent contains a tackifier resin described later in addition to the main component resin, the sum total of the main component resin content and the tackifier resin content is preferably 50% by mass or more, particularly preferably 70% by mass or more, more preferably 90% by mass or more, still more preferably 98% by mass or more, still more preferably 99% by mass or more, per 100% by mass of the total solid content of the adhesive agent. When the adhesive agent contains the heating element, it means a content ratio to the total solid content of the adhesive agent excluding the heating element content.

—Another Component—

Another component that can be used in the pressure-sensitive adhesive agent and the hot-melt adhesive agent is, for example, a tackifier resin, a cross-linker, an antioxidant, a thermally expandable filler, a solvent, an infrared absorber, an ultraviolet absorber, a filler; glass or plastic fiber; a filler, such as a balloon, a bead, or a metal powder; a pigment, a thickener, or the like.

The pressure-sensitive adhesive agent and the hot-melt adhesive agent may be of a thermal foaming type that can be foamed and/or expanded by heating and are preferably of a non-thermal-foaming type that is not foamed and/or expanded by heating. Even without a component (an expandable component) that can be foamed and/or expanded in an adhesive agent layer, such as a thermally expandable filler or a foaming agent, a resin contained in the adhesive agent can be melted or softened for separation. When the adhesive agent layer constituting the intermediate layer is of the non-thermal-foaming type, it is possible to avoid a failure of an article or a component caused by gas generated by foaming, damage to an article or a component caused by a pressure generated by expansion pressing an adherend, or the like. When the adhesive agent layer is of the thermal foaming type, after long-term use in an article or a component, the foaming agent or the like may be denatured, deactivated, or released to the outside and sometimes cannot be foamed at the time of disassembly. In contrast, an adhesive agent layer of the non-thermal-foaming type ensures disassembly even after long-term use in an article or a component. An adhesive agent not containing a component that can be foamed and/or expanded (an expandable component) means that the component content is less than 1 part by mass per 100 parts by mass of the base polymer of the adhesive agent.

—Tackifier Resin—

In the adhesive agent, a tackifier resin may be used to adjust the strong adhesiveness of an adhesive agent layer to be formed. The tackifier resin can be appropriately selected depending on the purpose without any limitation and is, for example, a rosin tackifier resin, a polymerized rosin tackifier resin, a polymerized rosin ester tackifier resin, a rosin phenolic tackifier resin, a stabilized rosin ester tackifier resin, a disproportionated rosin ester tackifier resin, a hydrogenated rosin ester tackifier resin, a terpene tackifier resin, a terpene phenolic tackifier resin, an aliphatic (petroleum resin) tackifier resin, a C5/C9 petroleum tackifier resin, a (meth)acrylate tackifier resin, or the like.

In addition to those described above, the tackifier resin may also be a tackifier resin that is liquid at room temperature. The liquid tackifier resin is, for example, a process oil, a polyester tackifier resin, a liquid rubber with a low molecular weight, such as polybutene, or the like.

The tackifier resin content of the adhesive agent is preferably in the range of 1 part by mass to 150 parts by mass, particularly preferably in the range of 10 parts by mass to 150 parts by mass, more preferably in the range of 15 parts by mass to 100 parts by mass, still more preferably in the range of 50 parts by mass to 100 parts by mass, per 100 parts by mass of the base polymer, because the adhesiveness of the adhesive agent at normal temperature can be improved and thermal durability can be exhibited.

—Cross-Linker—

In the adhesive agent, a cross-linker may be used to improve the cohesive force of an adhesive agent layer to be formed. The cross-linker can be appropriately selected depending on the purpose without any limitation and is, for example, an isocyanate cross-linker, an epoxy cross-linker, an aziridine cross-linker, a polyvalent metal salt cross-linker, a metal chelate cross-linker, a ketohydrazide cross-linker, an oxazoline cross-linker, a carbodiimide cross-linker, a silane cross-linker, a glycidyl (alkoxy) epoxy silane cross-linker, or the like.

The cross-linker content of the adhesive agent can be an amount at which the adhesive agent has a gel fraction in the range described later, and can be appropriately determined.

—Antioxidant—

The antioxidant can be appropriately selected depending on the purpose without any limitation and is, for example, a phenolic antioxidant, an amine antioxidant, or a carbodiimide antioxidant.

—Solvent—

The solvent can be appropriately selected from solvents commonly used in adhesive agent compositions depending on the purpose without any limitation and is, for example, an organic solvent, such as toluene, xylene, ethyl acetate, butyl acetate, acetone, methyl ethyl ketone, or hexane; water, an aqueous solvent composed mainly of water, or the like. The adhesive agent layer usually does not contain a solvent but may contain a residual solvent.

—Adhesive Agent—

When the adhesive agent contains the resin as the main component and the cross-linker, the adhesive agent preferably has a gel fraction in the range of 0% by mass to 80% by mass because the adhesive agent can be sufficiently melted and/or softened even in a short heating time. In the above range, the gel fraction more preferably ranges from 10% by mass to 65% by mass, still more preferably 15% by mass to 55% by mass, because the adhesive agent layer can have satisfactory initial tackiness and high holding power even in a high-temperature environment. In particular, when the adhesive agent is a pressure-sensitive adhesive agent, the gel fraction is preferably within the above range. On the other hand, in the above range, the gel fraction more preferably ranges from 0% by mass to 60% by mass, still more preferably 0% by mass to 40% by mass, due to the ease of disassembly by heating. In particular, when the adhesive agent is a hot-melt adhesive agent, the gel fraction is preferably within the above range.

The gel fraction of the adhesive agent is obtained by forming a coating film of the adhesive agent, immersing the coating film in toluene, leaving the coating film for 24 hours, measuring the mass of the remaining insoluble matter after drying, and expressing the mass as a percentage based on the original mass. The gel fraction of the adhesive agent can be adjusted by the amount of the cross-linker or the like.

[Layer Structure of Intermediate Layer A]

The intermediate layer A in the sticky tape may be a layer having adhesiveness on both surfaces thereof or may be a layer having no adhesiveness on both surfaces thereof. In particular, the intermediate layer A is preferably a layer having pressure-sensitive adhesiveness and/or thermal adhesiveness on both surfaces. This is because it can be easily bonded and adhere to another layer constituting the sticky tape, such as a heat-insulating layer. The intermediate layer A may be a single layer or may be composed of a plurality of layers.

When the intermediate layer A is a laminate, the adhesive agent layers a1 and a2 constituting the intermediate layer A may be collectively referred to as an adhesive agent layer a, and melt-softening layers c1 and c2 may be collectively referred to as a melt-softening layer c. The adhesive agent layer a, a heating element b, and the melt-softening layer c will be described in detail later.

The intermediate layer A in the sticky tape will be described below with reference to drawings. The adhesive agent layers B1 and B2 and the heat-insulating layer C in the sticky tape will be described separately.

First Embodiment

Figure 1B:
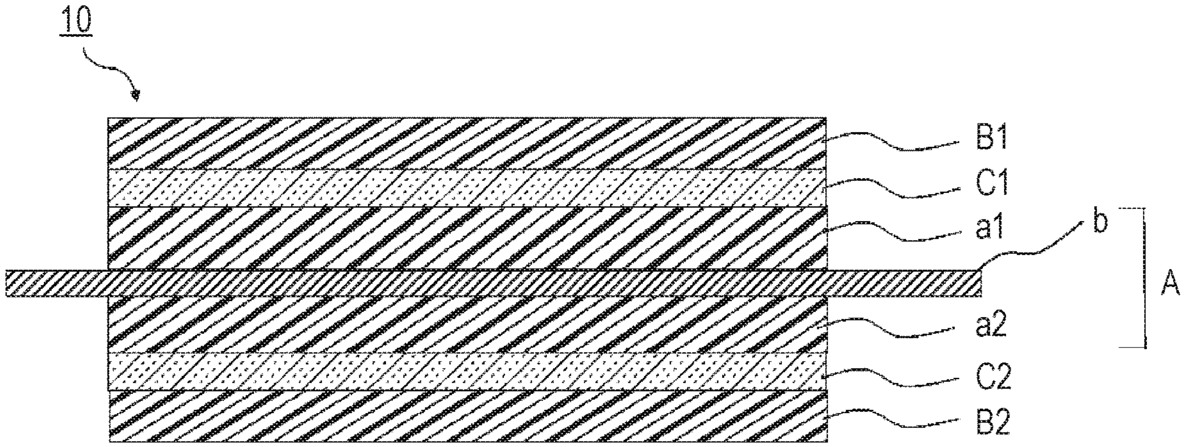
FIG. 1B is a schematic cross-sectional view of another example of a sticky tape according to one or more embodiments of the present invention.
Figure 1C:
FIG. 1C is a schematic plan view of another example of a sticky tape according to one or more embodiments of the present invention.

When the intermediate layer A is composed of a plurality of layers, for example, as illustrated in FIGS. 1A and 1B, the intermediate layer A in a sticky tape 10 may have a planar heating element b and an adhesive agent layer a1 and an adhesive agent layer a2 on each surface of the heating element and may be a laminate of adhesive agent layer a1/heating element b/adhesive agent layer a2 stacked in this order. Thus, an intermediate layer A of a first embodiment is a laminate of the heating element b, the adhesive agent layer a1 in contact with one surface of the heating element b, and the adhesive agent layer a2 in contact with the other surface of the heating element b. The adhesive agent layer a1 and the adhesive agent layer a2 may have the same composition or may have different compositions. At least one of the adhesive agent layer a1 and the adhesive agent layer a2 may be softened or melted by heating, and both of the adhesive agent layer a1 and the adhesive agent layer a2 may be softened or melted by heating. At least one of the adhesive agent layer a1 and the adhesive agent layer a2 in contact with the heating element b can be melted or softened by heating and have reduced adhesive strength, so that the intermediate layer A can be separated.

In particular, the adhesive agent layers a1 and a2 preferably have different compositions. When the adhesive agent layers a1 and a2 are formed of different adhesive agents, the tendency of the storage modulus or the loss tangent (tan δ) can be changed. Even when both the adhesive agent layer a1 and the adhesive agent layer a2 can be softened or melted by heating, the temperature or the separation position at the time of disassembly can be advantageously adjusted due to the difference in physical properties between the adhesive agent layers a1 and a2.

In the intermediate layer A of the first embodiment, the details of the adhesive agent forming the adhesive agent layer a can be the same as the details described above in the section of "<<Adhesive Agent>>".

At least one of the adhesive agent layers a1 and a2 is preferably a pressure-sensitive adhesive agent layer formed of a pressure-sensitive adhesive agent, and both of the adhesive agent layers a1 and a2 are more preferably a pressure-sensitive adhesive agent layer. The pressure-sensitive adhesive agent layer has tackiness at normal temperature, and the adhesive agent layer a1 and/or the adhesive agent layer a2, which is a pressure-sensitive adhesive agent layer, can be easily bonded and adhere to another layer, such as a heat-insulating layer, constituting the sticky tape.

At least one of the adhesive agent layers a1 and a2 may be a hot-melt adhesive agent layer formed of a hot-melt adhesive agent, or both of the adhesive agent layers a1 and a2 may be a hot-melt adhesive agent layer. A hot-melt adhesive agent exhibits adhesiveness when heated, and the adhesive agent layer a1 and/or the adhesive agent layer a2, which is a hot-melt adhesive agent layer, can therefore be easily bonded and adhere by heating to another layer, such as a heat-insulating layer, constituting the sticky tape.

Furthermore, one of the adhesive agent layers a1 and a2 may be a pressure-sensitive adhesive agent layer, and the other may be a hot-melt adhesive agent layer.

In the intermediate layer A of the first embodiment, the planar heating element b preferably has a pair of extended portions e extending and exposed from the outer periphery of the adhesive agent layer a1 and the adhesive agent layer a2 in a plan view (see FIGS. 1C and 1D-a to 1D-i).

The extended portions e may be independently provided at two or more positions, and the positions in the heating element can be appropriately selected depending on the purpose without any limitation. The two extended portions e may be located on the same side of the outer periphery of the adhesive agent layers a1 and a2 (see FIGS. 1D-a to 1D-c) or may be located on two different sides (see FIG. 1C and FIGS. 1D-d to 1D-f).

The extended portions e are preferably located on two opposite sides of the outer periphery of the adhesive agent layers a1 and a2 (see FIGS. 1D-d to 1D-f) and are preferably located on an approximately diagonal line of the outer periphery of the adhesive agent layers a1 and a2 (see FIGS. 1D-b to 1D-g). This allows an electric current to be passed through the entire region of the planar heating element b and can further increase the heating efficiency.

When the extended portions e are located on the same side of the outer periphery of the adhesive agent layers a1 and a2, the heating element b preferably has a U shape, a zigzag shape, or the like in a plan view (see FIGS. 1D-a to 1D-d and 1D-h). When the heating element can uniformly heat the in-plane of the adhesive agent layers a1 and a2, the extended portions e may be closely located on the same side (see FIGS. 1D-c and 1D-h). This allows an electric current to be passed through the entire region of the planar heating element b and can further increase the heating efficiency.

Furthermore, the extended portions e may be three or more positions (see FIG. 1D-i), and a desired pair (two positions) may be appropriately selected to energize the heating element. A pair of extended portions e of the heating element b functions as a pair of terminals for electrical connection to a power supply in a method for disassembling an article described later, so that the heating element b can be easily energized.

The length of each extended portion preferably ranges from 1 mm to 50 mm, more preferably 2 mm to 25 mm, from the perspective of facilitating contact with a power supply or a heat generation source. Each extended portion may be bent in a direction different from the plane direction of the sticky tape. For example, when adherends are bonded to each other, an extended portion may be folded in a direction perpendicular to the plane direction of the sticky tape and housed. When the bonding of adherends is to be released (at the time of disassembly), the extended portion may be folded again in the plane direction and brought into contact with a power supply or a heat generation source.

When the intermediate layer A is a laminate composed of a plurality of layers, the average thickness of each of the adhesive agent layers a1 and a2 can be appropriately selected depending on the purpose without any limitation and preferably ranges from, for example, 5 μm to 200 μm, more preferably 10 μm to 150 μm, still more preferably 20 μm to 100 μm. The average thickness of each of the adhesive agent layers a1 and a2 in a second embodiment described later can be defined in the same manner. When the intermediate layer A is a laminate composed of a plurality of layers, the total thickness of the intermediate layer A can be appropriately selected depending on the purpose without any limitation and preferably ranges from, for example, 15 μm to 500 μm, more preferably 30 μm to 400 μm, still more preferably 50 μm to 300 μm. The total thickness of the intermediate layer A in the second embodiment described below can be defined in the same manner.

Second Embodiment

Figure 2:
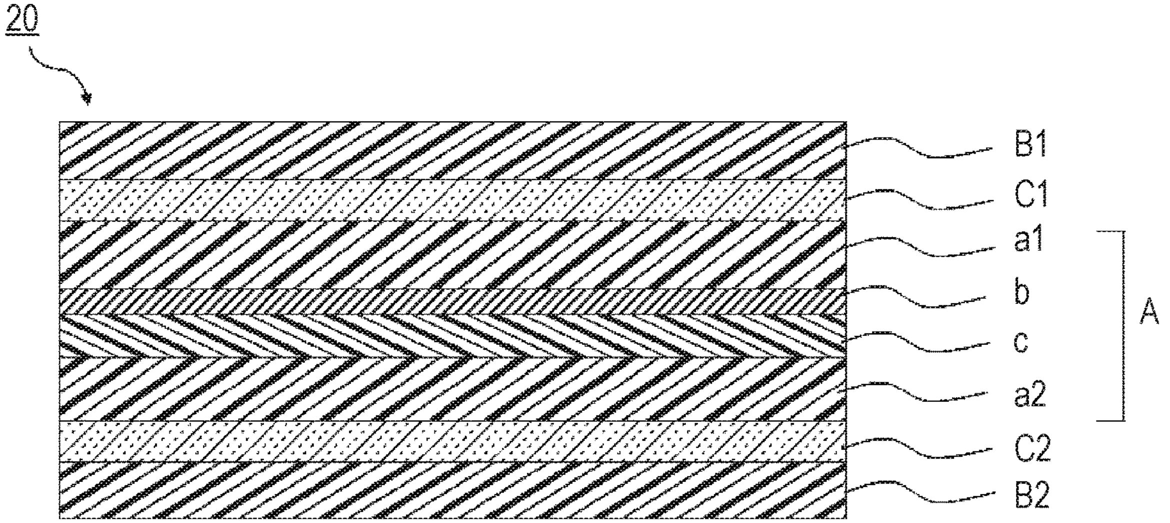
FIG. 2 is a schematic cross-sectional view of another example of a sticky tape according to one or more embodiments of the present invention.

As illustrated in FIG. 2, the intermediate layer A in a sticky tape 20 may be a laminate of adhesive agent layer a1/heating element b/melt-softening layer c stacked in this order. Alternatively, the intermediate layer A may be a laminate of melt-softening layer c/heating element b/adhesive agent layer a2 stacked in this order; a laminate of adhesive agent layer a1/heating element b/melt-softening layer c/adhesive agent layer a2 stacked in this order; a laminate of adhesive agent layer a1/melt-softening layer c/heating element b/adhesive agent layer a2 stacked in this order; or a laminate of adhesive agent layer a1/melt-softening layer c1/heating element b/melt-softening layer c2/adhesive agent layer a2 stacked in this order.

Thus, the intermediate layer A of the second embodiment has a heating element, one or two or more adhesive agent layers a, and the melt-softening layer c. An example of the intermediate layer A of the second embodiment is a laminate having the heating element b, the adhesive agent layer a disposed on one surface of the heating element b, and the melt-softening layer c disposed on the other surface of the heating element b. Another example of the intermediate layer A of the second embodiment is a laminate having the heating element b, the adhesive agent layer a1 disposed on one surface of the heating element b, the adhesive agent layer a2 disposed on the other surface of the heating element b, and the melt-softening layer c disposed at least one of between the heating element b and the adhesive agent layer a1 and between the heating element b and the adhesive agent layer a2.

At least the melt-softening layer c of the intermediate layer A is melted or softened by heating and allows the intermediate layer A to be separable. In this case, each layer of the adhesive agent layer a1 and the adhesive agent layer a2 may contain an adhesive agent that can be melted or softened by heating or may contain no adhesive agent that can be melted or softened by heating. The adhesive agent layer a1 and the adhesive agent layer a2 may have the same composition or may have different compositions. In a plan view, the planar heating element b preferably has a pair of extended portions extending and exposed from the outer periphery of the adhesive agent layer a1, the adhesive agent layer a2, and the melt-softening layer c. The details of the extended portions are the same as the details of the extended portions of the planar heating element b in the intermediate layer A of the first embodiment described above.

<<Adhesive Agent Layer a>>

In the intermediate layer A of the second embodiment, the adhesive agent layer a is preferably formed of a pressure-sensitive adhesive agent or a hot-melt adhesive agent. The details of the adhesive agent forming the adhesive agent layer a can be the same as the details described above in the section of "<<Adhesive Agent>>".

In the intermediate layer A of the second embodiment, the melt-softening layer can be melted or softened by heating, and the adhesive agent layer a therefore may be or may not be melted or softened by resistance heating and is preferably melted or softened.

In the intermediate layer A of the second embodiment, at least one of the adhesive agent layers a1 and a2 is preferably a pressure-sensitive adhesive agent layer formed of a pressure-sensitive adhesive agent, and both of the adhesive agent layers a1 and a2 are more preferably a pressure-sensitive adhesive agent layer. The pressure-sensitive adhesive agent layer has tackiness at normal temperature, and the adhesive agent layer a1 and/or the adhesive agent layer a2, which is a pressure-sensitive adhesive agent layer, can be easily bonded and adhere at normal temperature to another layer, such as a heat-insulating layer, constituting the sticky tape.

At least one of the adhesive agent layers a1 and a2 may be a hot-melt adhesive agent layer formed of a hot-melt adhesive agent, or both of the adhesive agent layers a1 and a2 may be a hot-melt adhesive agent layer. A hot-melt adhesive agent exhibits adhesiveness when heated, and the adhesive agent layer a1 and/or the adhesive agent layer a2, which is a hot-melt adhesive agent layer, can therefore be easily bonded and firmly adhere by heating to another layer, such as a heat-insulating layer, constituting the sticky tape.

Furthermore, one of the adhesive agent layers a1 and a2 may be a pressure-sensitive adhesive agent layer, and the other may be a hot-melt adhesive agent layer.

<<Melt-Softening Layer>>

The melt-softening layer is a layer that can be melted or softened by heating.

The melt-softening layer is any melt-softening layer that can adhere to the adhesive agent layer and the heating element and can ensure desired adhesive strength between adherends in an article described later, can be appropriately selected from resin layers that can be melted or softened by heat depending on the purpose, and is, for example, a thermoplastic resin film, a resin layer in which particles with a lower softening point than a base resin are dispersed in the base resin, or a resin layer in which particles with a softening point are dispersed in a base resin with no softening point.

A thermoplastic resin used for the thermoplastic resin film is, for example, a polyolefin resin, such as low-density polyethylene (LDPE), medium-density polyethylene (MDPE), polypropylene (PP), or linear low-density polyethylene (LLDPE); an ethylene copolymer resin, such as an ethylene-vinyl acetate copolymer (EVA), an ethylene-acrylic acid copolymer (EAA), or an ethylene-methacrylic acid copolymer (EMAA), a polyester resin, such as a crystalline polyester or an amorphous polyester, a urethane resin, or the like. Furthermore, a thermoplastic resin, a thermoplastic elastomer, or the like described above for the adhesive agent may also be used.

When it is difficult to adjust the melting or softening temperature by only a resin constituting the thermoplastic film, the thermoplastic film may contain an additive agent, such as a plasticizer or a tackifier resin.

The melt-softening layer preferably has a melting point of 70° C. or more and 150° C. or less, more preferably 75° C. or more and 130° C. or less, still more preferably 80° C. or more and 110° C. or less. This is because the melt-softening layer with a melting point in such a range can be easily melted or softened even by a small amount of resistance heating caused by energization. The melting point of the melt-softening layer can be adjusted by selecting the type, composition, or the like of a resin (particularly, a thermoplastic resin) that is a main component of the melt-softening layer. The melting point (melting temperature) of the melt-softening layer may be the temperature of an endothermic peak associated with melting measured by differential scanning calorimetry (DSC).

The storage modulus $G_{23}$ of the melt-softening layer measured in a dynamic viscoelastic spectrum at 1 Hz and 23° C. preferably ranges from $1.0\times10^3$ Pa to $1.0\times10^9$ Pa, more preferably $5.0\times10^3$ Pa to $5.0\times10^8$ Pa, particularly preferably $1.0\times10^4$ Pa to $1.0\times10^8$ Pa, from the perspective of being satisfactorily fixed to an adjacent layer in a normal state. The storage modulus $G_{23}$ of the melt-softening layer can be measured in the same manner as the storage modulus $G_{23}$ of the adhesive agent (adhesive agent layer).

The temperature at which the melt-softening layer has a storage modulus of less than $1.0\times10^5$ Pa preferably ranges from 80° C. to 200° C. The temperature at which the melt-softening layer has a storage modulus of less than $1.0\times10^4$ Pa more preferably ranges from 80° C. to 200° C. The temperature at which the melt-softening layer has a storage modulus of less than $1.0\times10^3$ Pa still more preferably ranges from 80° C. to 200° C. When the temperature at which the melt-softening layer has a storage modulus of less than $1.0\times10^5$ Pa ranges from 80° C. to 200° C., this is advantageous in that when the melt-softening layer reaches that temperature by receiving heat from the heating element, separation can occur due to melting or softening in the melt-softening layer or at an interface between these layers and an adjacent layer. The storage modulus of the melt-softening layer can be measured in the same manner as the storage modulus of the adhesive agent layer described above.

When the melt-softening layer is present, the average thickness of the melt-softening layer can be appropriately selected depending on the purpose without any limitation and preferably ranges from 5 μm to 200 μm, more preferably 10 μm to 150 μm, still more preferably 20 μm to 100 μm.

Third Embodiment

Figure 3:
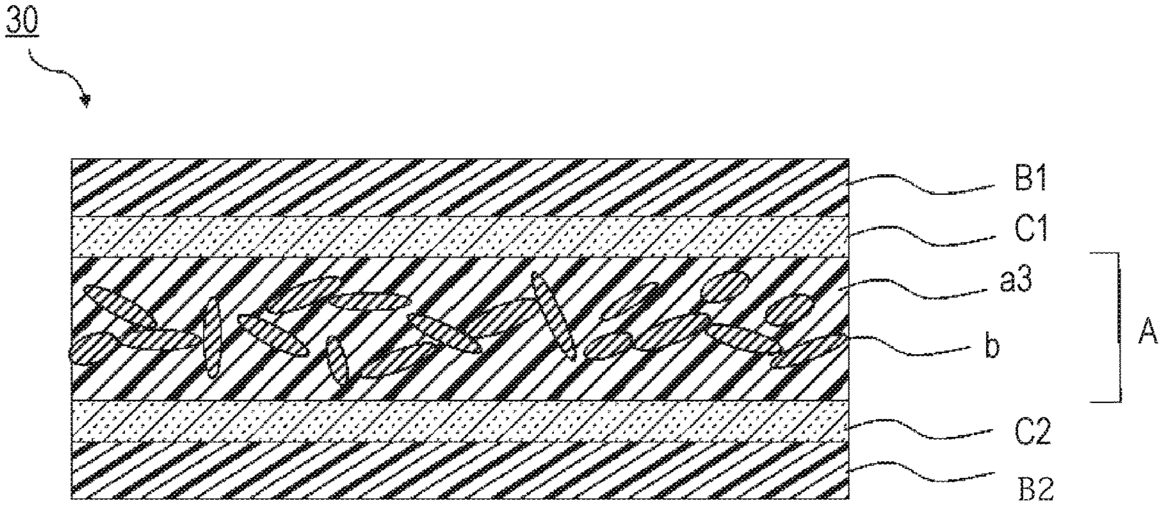
FIG. 3 is a schematic cross-sectional view of another example of a sticky tape according to one or more embodiments of the present invention.

When the intermediate layer A is a single layer, the intermediate layer A in a sticky tape 30 may be composed of a single layer of an adhesive agent layer a3 containing the heating element b and an adhesive agent (see FIG. 3). The heating element b may be mesh-like or in a form in which particles or fibers made of a heating element are dispersed, and can be appropriately selected depending on the heating means to be used. The adhesive agent layer a3 preferably contains, as the adhesive agent, at least one of the pressure-sensitive adhesive agent containing the thermoplastic resin and the hot-melt adhesive agent, and the adhesive agent layer a3 can be melted or softened by heating and have reduced adhesive strength, and the intermediate layer A can be separated.

In the intermediate layer A of a third embodiment, the adhesive agent layer a3 is preferably formed of a pressure-sensitive adhesive agent or a hot-melt adhesive agent. The details of the adhesive agent forming the adhesive agent layer a3 can be the same as the details described above in the section of "<<Adhesive Agent>>". In the intermediate layer A of the third embodiment, the details of the heating element b in the adhesive agent layer a3 can be the same as the details described above in the section of "<<Heating Element>>".

In the intermediate layer A of the third embodiment, both surfaces of the intermediate layer (the outermost surfaces facing each other in the thickness direction of the intermediate layer) preferably have adhesiveness (pressure-sensitive adhesiveness and/or thermal adhesiveness).

In the intermediate layer A of the third embodiment, the adhesive agent forming the adhesive agent layer a3 may be a pressure-sensitive adhesive agent. Thus, the intermediate layer A may be a pressure-sensitive adhesive agent layer a3 containing a heating element. This is because both surfaces of the intermediate layer A can have tackiness at normal temperature and can be bonded and adhere to another layer, such as a heat-insulating layer, constituting a sticky tape according to one or more embodiments of the present invention.

In the intermediate layer A of the third embodiment, the adhesive agent forming the adhesive agent layer a3 may be a hot-melt adhesive agent. Thus, the intermediate layer A may be a hot-melt adhesive agent layer a3 containing a heating element. A hot-melt adhesive agent exhibits adhesiveness when heated, and the intermediate layer A, which is a hot-melt adhesive agent layer, can therefore be easily bonded and adhere by heating to another layer, such as a heat-insulating layer, constituting the sticky tape.

When the intermediate layer A is a single layer, the total thickness of the intermediate layer A can be appropriately selected depending on the purpose without any limitation and preferably ranges from, for example, 15 μm to 500 μm, more preferably 30 μm to 400 μm, still more preferably 50 μm to 300 μm.

<Adhesive Agent Layers B1 and B2>

The adhesive agent layer B1 contains at least an adhesive agent B1 and further contains another component as required. The adhesive agent layer B1 is disposed on one surface side of the intermediate layer A. The adhesive agent layer B2 contains at least an adhesive agent B2 and further contains another component as required. The adhesive agent layer B2 is disposed on the other surface side of the intermediate layer A. At least one of the adhesive agent layer B1 and the adhesive agent layer B2 may be a heat-insulating layer C further having heat-insulating properties. The adhesive agent B1 and the adhesive agent B2 can be appropriately selected from a known adhesive agent or a general-purpose adhesive agent depending on the purpose without any limitation and are, for example, a pressure-sensitive adhesive agent or the like. The pressure-sensitive adhesive agent can be appropriately selected from the pressure-sensitive adhesive agent described for the intermediate layer A. The adhesive agent B1 and the adhesive agent B2 may have the same composition or may have different compositions.

The other component can be appropriately selected from the other component described for the intermediate layer A.

The average thickness of the adhesive agent layer B1 and the adhesive agent layer B2 can be appropriately selected depending on the purpose without any limitation and preferably ranges from 5 μm to 200 μm, more preferably 10 μm to 150 μm, still more preferably 15 μm to 100 μm.

<Heat-Insulating Layer C>

The heat-insulating layer C can be appropriately selected from any layer with heat-insulating properties depending on the purpose and is, for example, a planar layer having a void (hollow) therein, such as a foam layer, a hollow-containing layer, or a hollow-particle-containing layer, or the like. Among these, a foam layer is preferred from the perspective of flexibility, adhesion followability, and the like.

The heat-insulating layer C preferably has a thermal conductivity of 0.15 W/m·K or less, particularly preferably 0.1 W/m·K or less, more preferably 0.08 W/m·K or less, still more preferably 0.06 W/m·K or less, as measured in accordance with ASTM-D5470. The heat-insulating layer C with a thermal conductivity in the above range can block heat conduction from the heating element to an adherend, and the heat generated by the heating element can be efficiently used to melt or soften the intermediate layer A.

When the heat-insulating layer C is a foam layer, the foam layer may have closed cells or open cells. The foam layer may be a polyolefin foam composed of polyethylene, polypropylene, an ethylene-propylene copolymer, or an ethylene-vinyl acetate copolymer, a polyurethane foam, a rubber foam composed of an acrylic rubber or another elastomer, or the like. In particular, a polyolefin foam can preferably be used because of its high shape retention at high temperatures.

When at least one of the adhesive agent layer B1 and the adhesive agent layer B2 is a heat-insulating layer C further having heat-insulating properties, the heat-insulating layer C is, for example, an adhesive agent layer containing a hollow, an adhesive agent layer containing a hollow particle, or the like. The heat-insulating layer C is disposed at least one of between the intermediate layer A and the adhesive agent layer B1, and between the intermediate layer A and the adhesive agent layer B2. The heat-insulating layer C is preferably disposed between the intermediate layer A and the adhesive agent layer B1 and between the intermediate layer A and the adhesive agent layer B2.

The heat-insulating layer C preferably has a first region and a second region with lower thermal conductivity than the first region. The first region can be appropriately selected depending on the purpose without any limitation and is, for example, the adhesive agent, a resin, or the like. The resin may be a polyolefin resin, such as polyethylene or polypropylene; a polyester resin, such as poly(ethylene terephthalate), poly(ethylene naphthalate), or poly(butylene terephthalate); an acrylic resin; a styrene resin, such as polystyrene; a urethane resin, such as polyurethane; a poly(vinyl chloride) resin; an olefin elastomer; an acrylic elastomer; a styrene elastomer; a butyl elastomer; a rubber resin, such as natural rubber, or the like. The second region can be appropriately selected depending on the purpose without any limitation and may be a gas, such as air or an inert gas, may be a hollow particle containing the gas, may be a liquid or solid with low thermal conductivity, or may be a filler containing the liquid or solid. Among these, a gas and a hollow particle containing the gas are preferred.

Provided that desired heat-insulating properties can be exhibited, the average thickness of the heat-insulating layer C can be appropriately selected depending on the purpose without any limitation and preferably ranges from 15 μm to 1,000 μm, more preferably 30 μm to 500 μm, still more preferably 50 μm to 200 μm. Provided that heat-insulating properties due to a void can be exhibited, the porosity of the heat-insulating layer C preferably ranges from 5% to 90%, more preferably 10% to 80%, still more preferably 20% to 70%. Advantageously, the heat-insulating layer C with a thickness and a porosity in the above range can efficiently exhibit a heat-insulating effect.

The porosity of the heat-insulating layer C indicates the ratio of a void or a porous cavity (void) made of a gas contained in the heat-insulating layer C to the heat-insulating layer C and can be calculated by the following method. First, according to JIS K 6767, a heat-insulating layer with a thickness measured in advance is cut into a rectangle of 4 cm×5 cm to prepare an approximately 15-$cm^3$ portion. The mass of the portion is measured, and the density (X1) is determined from the mass and the volume. Next, the density (X2) is determined from the density derived from a material of a component constituting a region other than the void of the heat-insulating layer and the blending ratio thereof. When the heat-insulating layer is composed of one component, the density (X2) is the density derived from the material of the component. For example, when the heat-insulating layer is formed only of an acrylic resin, the density (X2) is the density of the acrylic resin. When the heat-insulating layer is composed of n types of components, the density (X2) can be calculated using the following formula:

Density ($X2$)=(the density derived from the material of Component 1×the ratio of Component 1 to the material of the heat-insulating layer)+(the density derived from the material of Component 2×the ratio of Component 2 to the material of the heat-insulating layer)+ . . . +(the density derived from the material of Component $n$×the ratio of Component $n$ to the material of the heat-insulating layer)

The total of the ratios of Component 1 to Component n is 100% by mass.

The porosity is calculated from the density (X1) and the density (X2) using the following formula:

$$\text{Porosity }(\%)=\{1-(\text{density }X1/\text{density }X2)\}\times 100$$

<Separation Layer>

The sticky tape may have another layer, such as a separation layer. The separation layer can be appropriately selected depending on the purpose without any limitation and is, for example, glassine paper, kraft paper, clay-coated paper, paper laminated with a film, such as polyethylene, paper coated with a resin, such as poly(vinyl alcohol) or an acrylate copolymer, a synthetic resin film, such as a polyester or polypropylene, coated with a release agent, such as a fluoropolymer or a silicone resin, or the like. The separation layer may be provided on one or both surfaces of the sticky tape.

[Use of Sticky Tape]

In a sticky tape according to one or more embodiments of the present invention, both surfaces except a release liner function as surfaces with adhesiveness (adhesive surfaces). Thus, both surfaces of the sticky tape can be bonded to an adherend and can be suitably used for bonding adherends to each other. A sticky tape according to one or more embodiments of the present invention can be separated by resistance heating and is therefore used as a resistance heating (electrical heating) release tape.

A sticky tape according to one or more embodiments of the present invention can be suitably, but not necessarily, used for adhesion between adherends that are rigid bodies, and separation between the adherends. A sticky tape according to one or more embodiments of the present invention can be easily disassembled by heating when components are separated for reuse or recycling. Thus, the sticky tape can be used in applications where the sticky tape needs to be separated. For example, the sticky tape can be suitably used as a sticky tape for fixing components of various products in industrial applications, such as electronic devices, automobiles, construction materials, office automation (OA), and home appliances. The sticky tape also has high working efficiency in separating a large number of components, removing a large number of labels, or the like, for reuse or recycling.

[Layer Structure of Sticky Tape]

The layer structure of the sticky tape will be described with reference to drawings. As illustrated in FIGS. 1A and 1B, the sticky tape 10 may be a laminate having the intermediate layer A, an adhesive agent layer B1 disposed on one surface side of the intermediate layer A, an adhesive agent layer B2 disposed on the other surface side of the intermediate layer A, and a heat-insulating layer C between the intermediate layer A and the adhesive agent layer B1 and between the intermediate layer A and the adhesive agent layer B2, stacked in the order of adhesive agent layer B1/heat-insulating layer C1/intermediate layer A/heat-insulating layer C2/adhesive agent layer B2. The sticky tapes 20 and 30 illustrated in FIGS. 2 and 3 are also laminates of adhesive agent layer B1/heat-insulating layer C1/intermediate layer A/heat-insulating layer C2/adhesive agent layer B2 stacked in this order as in FIGS. 1A and 1B except that the layer structure of the intermediate layer A is different. The adhesive agent layer B1 and adhesive agent layer B2 may have the same composition or may have different compositions. The heat-insulating layer C1 and the heat-insulating layer C2 may have the same composition or may have different compositions.

Figure 4:
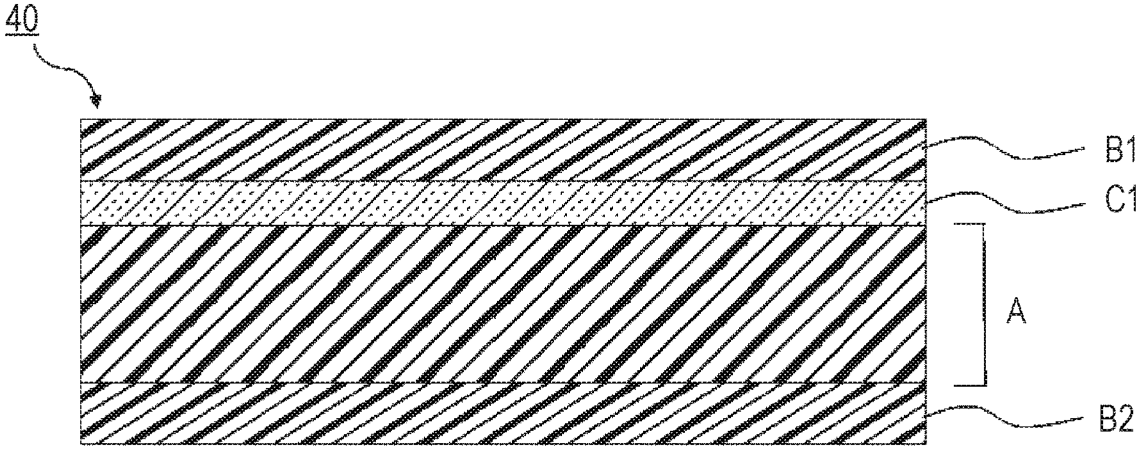
FIG. 4 is a schematic cross-sectional view of another example of a sticky tape according to one or more embodiments of the present invention.

As illustrated in FIG. 4, a sticky tape 40 may be a laminate having an intermediate layer A, an adhesive agent layer B1 disposed on one surface side of the intermediate layer A, an adhesive agent layer B2 disposed on the other surface side of the intermediate layer A, and a heat-insulating layer C between the intermediate layer A and the adhesive agent layer B1 or between the intermediate layer A and the adhesive agent layer B2, stacked in the order of adhesive agent layer B1/heat-insulating layer C1/intermediate layer A/adhesive agent layer B2. It may also be a laminate of adhesive agent layer B1/intermediate layer A/heat-insulating layer C2/adhesive agent layer B2 stacked in this order. The intermediate layer A may be any one appropriately selected from the first to third embodiments.

Figure 5:
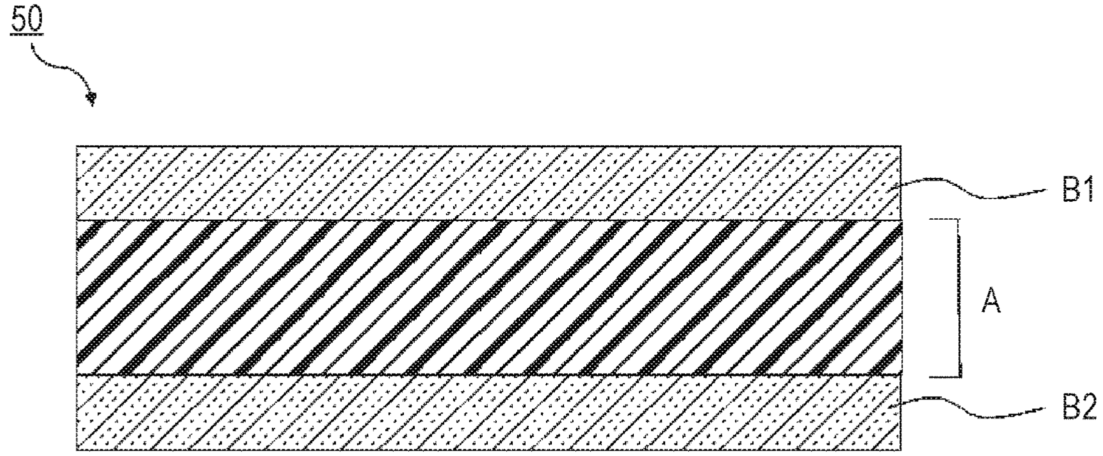
FIG. 5 is a schematic cross-sectional view of another example of a sticky tape according to one or more embodiments of the present invention.

As illustrated in FIG. 5, a sticky tape 50 may have an intermediate layer A, an adhesive agent layer B1 disposed on one surface side of the intermediate layer A, and an adhesive agent layer B2 disposed on the other surface side of the intermediate layer A, and at least one of the adhesive agent layer B1 and the adhesive agent layer B2 may be a heat-insulating layer C further having heat-insulating properties. The sticky tape 50 is a laminate of adhesive agent layer B1 (=heat-insulating layer C1)/intermediate layer A/adhesive agent layer B2 (=heat-insulating layer C2) stacked in this order. The sticky tape may be a laminate of adhesive agent layer B1 (=heat-insulating layer C1)/intermediate layer A/adhesive agent layer B2 stacked in this order or a laminate of adhesive agent layer B1/intermediate layer A/adhesive agent layer B2 (=heat-insulating layer C2) stacked in this order. The intermediate layer A may be any one appropriately selected from the first to third embodiments.

[Method for Producing Sticky Tape]

The sticky tape is produced, for example, by preparing a layer by applying a composition containing the adhesive agent B1 to a release sheet and drying the composition, preparing a layer by applying a composition containing the adhesive agent B2 to a release sheet and drying the composition, preparing the heat-insulating layer C, and sequentially bonding these layers to each surface of the intermediate layer A. When the intermediate layer A has a planar heating element or an integrally formed mesh-like heating element, the intermediate layer A may be produced, for example, by applying a composition containing the adhesive agent to a release sheet, applying a composition containing the adhesive agent to a release sheet, drying the compositions, and then bonding these to the surfaces of the heating element. When the intermediate layer A has a particulate or fibrous heating element, the sticky tape may be produced, for example, by applying a composition containing the particulate or fibrous heating element and an adhesive agent to a release sheet, drying the composition, and then bonding this to a release sheet (or the adhesive agent layer B1 or B2, the heat-insulating layer C, or the like).

The heat-insulating layer C can be produced by a known method depending on the type of heat-insulating layer. For example, when the heat-insulating layer C is a foam layer, the foam layer can be produced by a known method for producing a foam, more specifically, by adding a foaming agent, a cross-linker, and if necessary a polyfunctional monomer and an additive agent, such as a filler, to a resin for foam to prepare a mixture, forming the mixture into a predetermined shape, cross-linking the mixture by radiation or by heating at a temperature below the decomposition temperature of the foaming agent, and then foaming the mixture by heating at a temperature above the decomposition temperature of the foaming agent. The cross-linking and the foaming may be performed simultaneously. The heat-insulating layer may be a commercially available foam. When the heat-insulating layer C is a hollow-containing layer, the hollow-containing layer can be produced, for example, by dispersing a thermally expandable filler or the like in a resin to prepare a composition, forming the composition into a layer by a desired method, such as extrusion or coating, and foaming the thermally expandable filler or the like to form a hollow in the layer. When the heat-insulating layer C is a hollow-particle-containing layer, the hollow-particle-containing layer can be produced, for example, by forming a composition containing hollow particles dispersed in a resin into a layer by a desired method, such as extrusion or coating.

2. Article

An article according to one or more embodiments of the present invention is an article at least containing at least two adherends and a sticky tape according to one or more embodiments of the present invention between two of the adherends, and two of the adherends are bonded together via the sticky tape. The adherends may be bonded together by attaching each adherend to an adhesive surface of the sticky tape to bond two adherends together. The article can be appropriately selected depending on the purpose without any limitation and is preferably an electronic device, a component to be incorporated in an electronic device, or the like. In the article, the sticky tape preferably has a pair of extended portions extending from the outer periphery of the adherend in a plan view.

<Sticky Tape>

The details of a sticky tape in an article according to one or more embodiments of the present invention are described above in the section of "1. Sticky Tape".

<Adherend>

The adherend may have rigidity or may have flexibility like a film or the like. The adherend can be appropriately selected depending on the purpose without any limitation and is, for example, a metal sheet, a metal housing, a metal cover, a glass plate, or a plastic sheet; or a component having any of these on an adherend surface. The two adherends to be bonded together via the sticky tape may be the same or different.

Figure 6A:
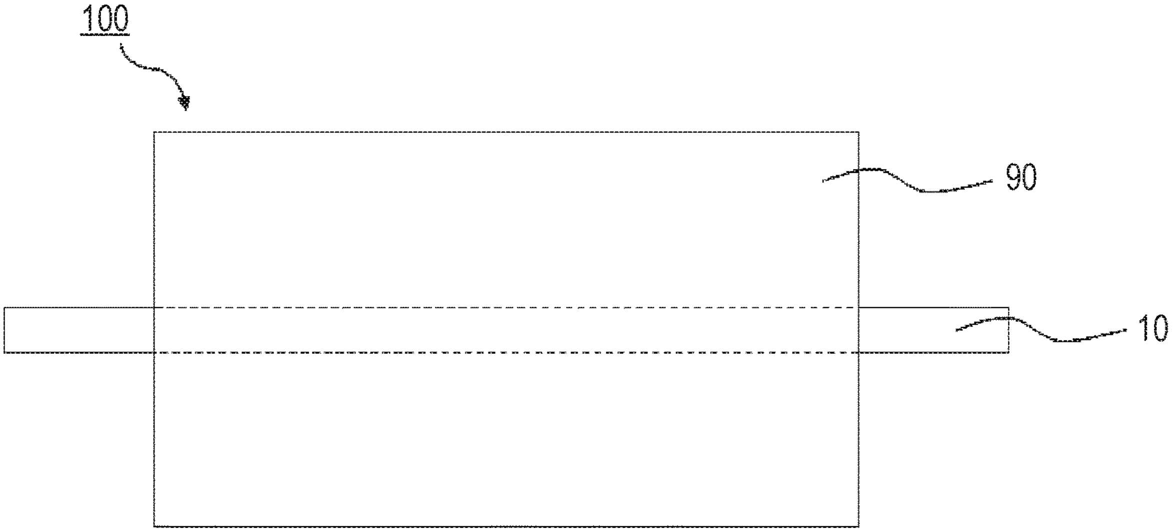
FIG. 6A is a schematic plan view of an example of an article according to one or more embodiments of the present invention.
Figure 6B:
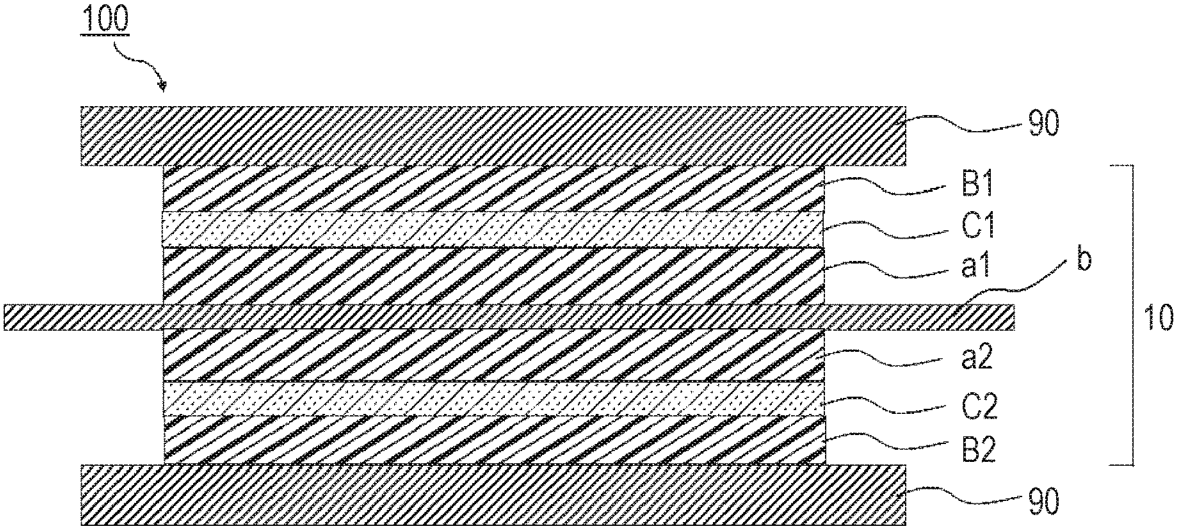
FIG. 6B is a schematic cross-sectional view of an example of an article according to one or more embodiments of the present invention.

For example, as illustrated in a schematic plan view of FIG. 6A and a schematic cross-sectional view of FIG. 6B, an article 100 according to one or more embodiments of the present invention includes two adherends 90 and a sticky tape 10 between the two adherends 90, the sticky tape 10 including a laminate of adhesive agent layer B1/heat-insulating layer C1/intermediate layer A/heat-insulating layer C2/adhesive agent layer B2 stacked in this order, and the two adherends 90 are bonded together via the sticky tape 10. In the plan view (FIG. 6A), both ends of the intermediate layer A in the long axis direction are extended from the outer periphery of the adherends. Furthermore, both ends of the planar heating element b in the long axis direction are extended from the outer periphery of the adhesive agent layer a1 and the adhesive agent layer a2.

When the heating means in a method for disassembling an article described later is resistance heating or heat conduction, the extending ends of the sticky tape 10 can be used as a pair of terminals for electrical connection to a power supply or as an end portion to be brought into contact with a heat generation source, and the heating element b of the sticky tape 10 can be easily heated. As illustrated in FIG. 6A, in a plan view, a smaller contact area between an adherend and the sticky tape is advantageous in that the heating element has high heating efficiency and disassembly is easy because disassembly is easy to start during heating.

Although not shown in the figure, an article according to one or more embodiments of the present invention may include two adherends 90 and one of the sticky tapes 10 to 50 illustrated in FIGS. 1A to 5 between the two adherends 90, and the two adherends 90 may be bonded via the sticky tape.

In a plan view of the article, the sticky tape may be bonded to the entire region of an adherend surface, which is a surface of an adherend facing the sticky tape, or may be bonded to a portion of the adherend surface of the adherend. In particular, as exemplified in FIG. 6A, the sticky tape 10 is preferably bonded to a portion of the adherend surface of the adherends 50. A small contact area between an adherend and a sticky tape is advantageous in that, when the sticky tape is separated from the adherend by resistance heating, a separation starting point is easily formed between the adherend and the sticky tape, and the sticky tape is therefore easily separated.

As exemplified in FIG. 6A, when the sticky tape 10 is bonded to a portion of the adherend surface of the adherends 50 in a plan view of an article according to one or more embodiments of the present invention, the shape of the sticky tape 10 in the article in a plan view may be a belt-like shape, a linear shape, or a pattern shape.

In a plan view of an article according to one or more embodiments of the present invention, when the sticky tape is bonded to the entire region of an adherend surface, which is a surface of an adherend facing the sticky tape, a planar heating element in the sticky tape may have the same shape as the sticky tape in a plan view and may have a belt-like shape, a linear shape, or a pattern shape.

3. Method for Disassembling Article

A method for disassembling an article according to one or more embodiments of the present invention is a method for disassembling an article according to one or more embodiments of the present invention or a method for disassembling an article with two adherends bonded via a sticky tape according to one or more embodiments of the present invention and includes a separation step and another optional step.

The details of an article and a sticky tape used for the article in a disassembling method according to one or more embodiments of the present invention are the same as the details described in the sections of “2. Article” and “1. Sticky Tape”.

<Separation Step>

The separation step is a step of softening or melting the intermediate layer A by heating of the heating element to separate the two adherends.

The means and method for heating the heating element can be appropriately selected depending on the purpose without any limitation and are, for example, electromagnetic induction heating, infrared heating, microwave heating, heat conduction, resistance heating, or the like. Among these, resistance heating is preferred.

<<Resistance Heating>>

When heating of the heating element is resistance heating, the separation step is preferably a step of electrically connecting the intermediate layer A to a power supply, energizing the heating element from the power supply, and softening or melting the intermediate layer A by resistance heating to separate the two adherends.

The power supply can be appropriately selected depending on the purpose without any limitation, may be an external power supply or a driving power supply for the article, which is an electronic device or a component to be incorporated in an electronic device, and is preferably a driving power supply for an electronic device or a component to be incorporated in an electronic device. When the article is an electronic device or a component to be incorporated in an electronic device, and the power supply is a driving power supply for the electronic device, the separation step is preferably a step of electrically connecting the intermediate layer A to the driving power supply for the electronic device and an electric circuit, energizing the heating element from the driving power supply, and melting or softening the intermediate layer A by resistance heating to separate the two adherends.

The electrical connection may be performed by a method of electrically connecting the intermediate layer A (preferably, the heating element or both ends of the extended heating element) to the power supply, for example, using a known means, such as an alligator clip. The electric circuit and the electrically connecting means are preferably formed of an electrically conductive material with volume resistivity different from that of the material of the heating element in the sticky tape, particularly an electrically conductive material with lower volume resistivity than the heating element. When the means is formed of an electrically conductive material with lower volume resistivity than the heating element, it is advantageous in that when the heating element and the electric circuit are electrically connected and the heating element is energized from the driving power supply, a voltage is efficiently applied to the intermediate layer A to be separable in a short time while preventing the electric circuit and the electrically connecting means from being excessively heated.

The energization method can be appropriately selected depending on the size of the sticky tape, the heating element to be used, and the like, and is, for example, a method of applying a voltage in the range of 0.1 V to 200 V until the intermediate layer A is melted or softened (for example, for 0.5 seconds to 30 minutes).

Figure 7:
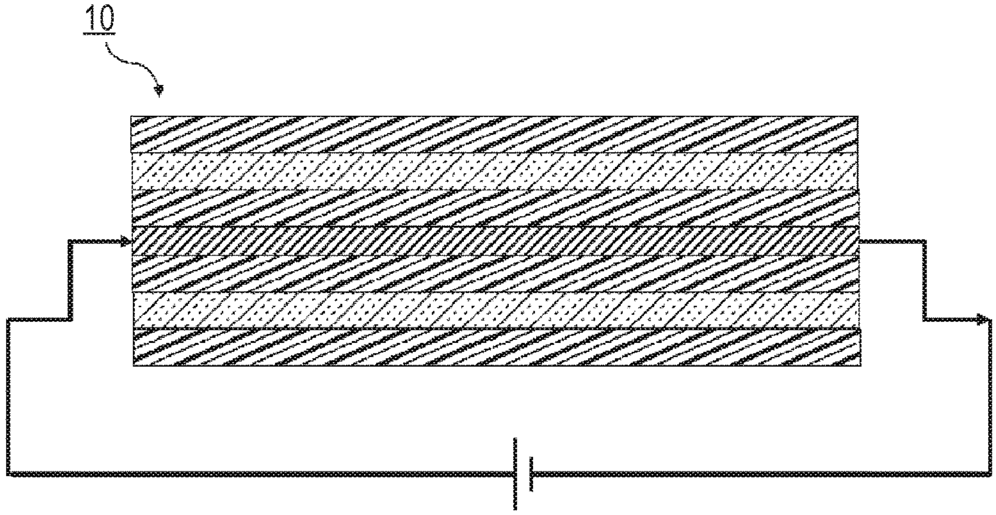
FIG. 7 is a schematic view of a method for disassembling an article according to one or more embodiments of the present invention.

For example, as schematically illustrated in FIG. 7, a simple power supply can be used, and the intermediate layer A of the sticky tape is electrically connected to the power supply to apply a voltage to and energize the heating element, thereby heating the heating element and the periphery thereof by resistance heating. This can soften or melt a sticky agent or a melt-softening layer, release the adhesive state in the intermediate layer A itself or at a desired position in the intermediate layer A and separate the intermediate layer A, and disassemble the bonded adherends.

The voltage applied to the heating element by energization is preferably, but not limited to, 0.1 V or more and 200 V or less, more preferably 0.5 V or more and 150 V or less, still more preferably 1.0 V or more to 100 V or less. In a sticky tape according to one or more embodiments of the present invention, the intermediate layer A is softened or melted in a short time even at a low applied voltage. Thus, at an applied voltage within the above range in the separation step, the article can be disassembled in a short time without applying an excessive voltage, and the article can be prevented from being damaged. In particular, at a voltage that can be applied to a small electronic device or home appliances, these articles can be easily disassembled.

The electric current applied to the heating element is preferably, but not limited to, 0.01 A or more and 20 A or less, preferably 0.03 A or more and 15 A or less, preferably 0.05 A or more and 10 A or less, more preferably 0.1 A or more and 5 A or less. In a sticky tape according to one or more embodiments of the present invention, the intermediate layer A is softened or melted in a short time. Thus, at an applied electric current within the above range in the separation step, an electric current flowing through a general-purpose electronic device or home appliances can be applied to disassemble the article in a short time without damage to the article. In particular, at an electric current that can be applied to a small electronic device or home appliances, these articles can be easily disassembled.

The application time of the electric current is preferably, but not limited to, 0.5 seconds or more and 30 minutes or less, particularly preferably 0.5 seconds or more and 120 seconds or less, more preferably 0.5 seconds or more and 30 seconds or less. At an application time within the above range and at an appropriate voltage, the article can be disassembled in a short time without damage.

<<Electromagnetic Induction Heating>>

When the heating of the heating element is electromagnetic induction heating, the separation step is preferably a step of softening or melting the intermediate layer A by electromagnetic induction heating using electromagnetic induction heating means to separate the two adherends. The electromagnetic induction heating means can be appropriately selected from known electromagnetic induction heating apparatuses depending on the purpose without any limitation.

<<Infrared Heating and Microwave Heating>>

When the heating of the heating element is infrared heating or microwave heating, the separation step is preferably a step of softening or melting the intermediate layer A by infrared heating using infrared heating means or by microwave heating using microwave heating means to separate the two adherends. The infrared heating means and microwave heating means can be appropriately selected from known infrared heating apparatuses and microwave heating apparatuses depending on the purpose without any limitation.

<<Heat Conduction>>

When the heating of the heating element is heat conduction, the separation step is preferably a step of bringing the intermediate layer A into contact with a heat generation source to soften or melt the intermediate layer A by heat conduction and separate the two adherends. The heat generation source can be appropriately selected from known heaters depending on the purpose without any limitation. The heat conduction method using the heat generation source can be appropriately selected depending on the size of a sticky tape, a heating element to be used, or the like and is, for example, a method of performing the contact at a desired temperature until the intermediate layer A is melted or softened.

EXAMPLES

Although one or more embodiments of the present invention are more specifically described in the following examples, the present invention is not limited to these examples. Unless otherwise specified, "parts" refers to "parts by mass", and "%" refers to "% by mass".

The structure of a sticky tape in Examples and Reference Examples excludes a release liner, and the total thickness of the sticky tape does not include the thickness of the release liner.

<Method for Measuring Physical Properties>

(Storage Modulus $G_{23}$ and Storage Modulus $G_{100}$)

The storage modulus $G_{23}$ and the storage modulus $G_{100}$ of an adhesive agent layer a formed of adhesive agent compositions (P-1) and (P-2) were measured by the following method. In a viscoelastometer (ARES-G2, manufactured by TA Instruments Japan), a test specimen was placed between parallel disks with a diameter of 8 mm, which are measurement portions of the viscoelastometer, and the storage modulus G' was measured as values at 23° C. and 100° C. at a frequency of 1 Hz in the temperature range of −40° C. to 200° C. at a heating rate of 2° C./min. The test specimen was an adhesive agent layer (a sticky agent layer) formed by applying and drying the adhesive agent composition using an applicator to a dry thickness of approximately 2 mm and aging the adhesive agent composition in an 40° C. environment for 48 hours.

(Measured Value of Volume Resistivity of Heating Element)

The volume resistivity of each heating element used in Examples and Reference Examples was measured with a low resistivity meter (trade name: "Loresta-AX MCP-T370", manufactured by Nittoseiko Analytech Co., Ltd.) and a four-point probe (trade name: "ASP probe MCP-TP03P", manufactured by Nittoseiko Analytech Co., Ltd.) at a room temperature of 20° C. in accordance with JIS K 7194. The number of measurement points was one, and the resistivity correction factor was 4.532.

<Preparation of Adhesive Agent Composition (P-1)>

An adhesive agent composition (P-1) was produced by mixing 100 parts by mass of a styrene-isoprene block copolymer composition a (a mixture of a styrene-isoprene diblock copolymer and a styrene-isoprene triblock copolymer, 24% by mass of a styrene-derived structural unit represented by the following chemical formula (1), and 67% by mass of the styrene-isoprene diblock copolymer based on the total amount of the composition a), 40 parts by mass of Quintone G115 (a C5/C9 petroleum resin manufactured by Zeon Corporation, softening point: 115° C.), 30 parts by mass of Pensel D-160 (a polymerized rosin ester resin manufactured by Arakawa Chemical Industries, Ltd., softening point: 15° C. to 150° C.), 5 parts by mass of Nisseki polybutene HV-50 (polybutene manufactured by JX Nippon Oil & Energy Corporation, pour point: −12.5° C.), and 1 part by mass of an antioxidant (tetrakis-[methylene-3-(3'5'-di-t-butyl-4-hydroxyphenyl)propionate]methane), and by dissolving the mixture in 100 parts by mass of toluene as a solvent.

[Chem. 1]

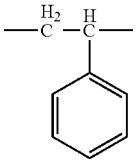

(1)

<Preparation of Adhesive Agent Composition (P-2)>

A reaction vessel equipped with a stirrer, a reflux condenser, a nitrogen inlet tube, and a thermometer was charged with 79.9 parts by mass of n-butyl acrylate, 6 parts by mass of 2-ethylhexyl acrylate, 10 parts by mass of cyclohexyl acrylate, 4 parts by mass of acrylic acid, 0.1 parts by mass of 4-hydroxybutyl acrylate, and 200 parts by mass of ethyl acetate, which were then subjected to nitrogen bubbling with stirring at normal temperature for 1 hour to produce a mixture. Next, 2 parts by mass of a solution of 2,2'-azobis (2-methylbutyronitrile) dissolved in ethyl acetate in advance (solid content: 1.0% by mass) was added to the mixture, and the mixture was held with stirring at 72° C. for 4 hours and then at 75° C. for 5 hours. The resulting mixture was then diluted with ethyl acetate and was filtered through a 200-mesh screen to produce a solution of an acrylic copolymer (A-1) with a weight-average molecular weight of 1,060,000 and with an average carbon atoms number of a saturated hydrocarbon group of an alkyl acrylate monomer of 4.4 (solid concentration: 26%). 1.0 part by mass of an adduct of tolylene diisocyanate and trimethylolpropane ("Burnock D-40" manufactured by DIC Corporation, an isocyanate cross-linker, solid content: 40%, hereinafter referred to as "D-40") was added as a cross-linker to 100 parts by mass of the acrylic copolymer (A-1) solution to produce an adhesive agent composition (P-2).

Example 1

<Preparation of Sticky Tape>

<Production of Foam Layer>

A polyethylene foam layer (thickness: 100 μm, porosity: 60%) was used as a heat-insulating layer C.

<<Preparation of Intermediate Layer A>>

The adhesive agent composition (P-1) was applied to a release-treated surface of a release liner (a 75-μm-thick poly(ethylene terephthalate) film with one surface treated to be releasable) to a dry thickness of 50 μm and was dried at 90° C. for 3 minutes to produce an adhesive agent layer a1.

Next, the adhesive agent composition (P-2) was applied to a release-treated surface of a release liner (a 75-μm-thick poly(ethylene terephthalate) film with one surface treated to be releasable) to a dry thickness of 50 μm and was dried at 90° C. for 3 minutes to produce an adhesive agent layer a2.

A 10-μm-thick nichrome foil ("Nichrome NCH1-H" manufactured by Takeuchi Metal Foil & Powder Co., Ltd.) was used as a heating element. The adhesive agent layer a1 with a length of 50 mm cut to an arbitrary width and the nichrome foil with a length of 100 mm were bonded together with a hand roller such that the nichrome foil were extended by 25 mm at each end in the length direction. In the same manner, the adhesive agent layer a2 with a length of 50 mm cut to an arbitrary width was bonded to the opposite surface of the nichrome foil bonded to the adhesive agent layer a1, and they were pressed from the upper surface of the release liner with a roller at a linear pressure of 5 kg/cm to prepare a laminate with a total thickness of 110 μm such that each end of the nichrome foil was extended by 25 mm from the outer periphery of the adhesive agent layer a1 and the adhesive agent layer a2 in the length direction of the nichrome foil, and were then aged in an 40° C. environment for 48 hours. This was cut to a width of 2 mm to produce an intermediate layer A in which the adhesive agent layer a1 and the adhesive agent layer a2 had a width of 2 mm and a length of 50 mm, the nichrome foil had a size of 2 mm×100 mm in length, and the nichrome foil had a pair of extended portions extending from the outer periphery of the adhesive agent layer a1 and the adhesive agent layer a2. The volume resistivity of the nichrome foil was 108 μΩ·cm as a catalog value and 105 μΩ·cm as a measured value. The intermediate layer A formed in Example 1 is referred to as an intermediate layer (A-1).

The viscoelastic parameters of the adhesive agent layer formed of the adhesive agent composition (P-1) were as follows: storage modulus $G_{23}$ at 23° C.: 3.E+05, loss tangent (tan δ) at 23° C.: 0.33, storage modulus $G_{100}$ at 100° C.: 8.E+04, loss tangent (tan δ) at 100° C.: 0.48, and the temperature at which the loss tangent (tan δ) was 0.45 or more: 94° C. or more.

The viscoelastic parameters of the adhesive agent layer formed of the adhesive agent composition (P-2) were as follows: storage modulus $G_{23}$ at 23° C.: 9.E+04, loss tangent (tan δ) at 23° C.: 0.69, storage modulus $G_{100}$ at 100° C.: 2.E+04, loss tangent (tan δ) at 100° C.: 0.33, and the temperature at which the loss tangent (tan δ) was 0.45 or more: more than 150° C.

<<Preparation of Laminate of Adhesive Agent Layer B1 and Heat-Insulating Layer C>>

The adhesive agent composition (P-2) was applied to a release-treated surface of a release liner (a 75-μm-thick poly(ethylene terephthalate) film with one surface treated to be releasable) to a dry thickness of 50 μm and was dried at 90° C. for 3 minutes to produce an adhesive agent layer B1. The adhesive agent layer B1 and the heat-insulating layer C (polyethylene foam layer) were bonded together and were then pressed from the upper surface of the release liner with a roller at a linear pressure of 5 kg/cm. This was aged in a 40° C. environment for 48 hours to produce a laminate (T-2) in which the adhesive agent layer B1 and the heat-insulating layer C with a total thickness of 150 μm were stacked. Two laminates (T-2) were produced.

The intermediate layer (A-1) was placed between the two laminates (T-2) with a length of 50 mm cut to an arbitrary width such that the foam layer was in contact with both surfaces of the intermediate layer (A-1), was bonded such that the end portions of the adhesive agent layer a1 and the adhesive agent layer a2 coincided with the end portions of T-2, and was pressed from the upper surface of the release liner with a roller at a linear pressure of 5 kg/cm to produce a sticky tape of Example 1 with a total thickness of 410 μm.

Figure 8A:
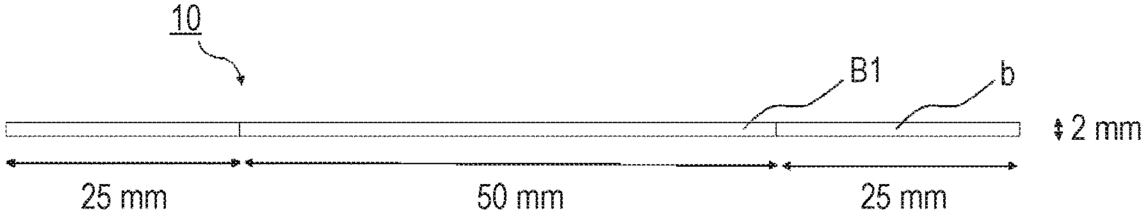
FIG. 8A is a schematic plan view of a sticky tape of Example 1.
Figure 8B:
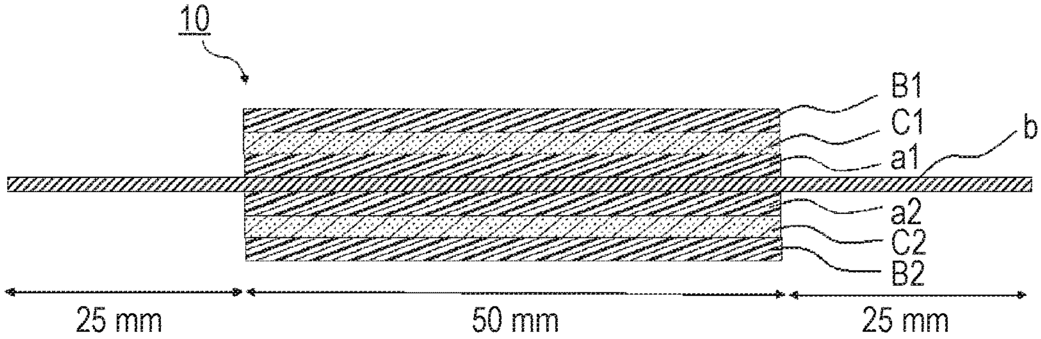
FIG. 8B is a schematic cross-sectional view of the sticky tape of Example 1.

In the sticky tape of Example 1, the layer structure excluding the release liner is a laminate of adhesive agent layer B1/heat-insulating layer C/adhesive agent layer a1/heating element b/adhesive agent layer a2/heat-insulating layer C/adhesive agent layer B1 stacked in this order, and the adhesive agent layers a1 and a2 and the adhesive agent layer B1 are formed of a pressure-sensitive adhesive agent. In the sticky tape of Example 1, the size (effective portion) of the adhesive surface was 2 mm in width×50 mm in length, the size of the nichrome foil was 2 mm in width×100 mm in length, and both ends of the nichrome foil were disposed so as to extend from the outer periphery of the adhesive agent layer a1 (and the adhesive agent layer a2 on the back surface) (see FIGS. 8A and 8B). The volume resistivity of the nichrome foil was 108 μΩ·cm as a catalog value and 105 μΩ·cm as a measured value.

<Preparation of Article>

Figure 9A:
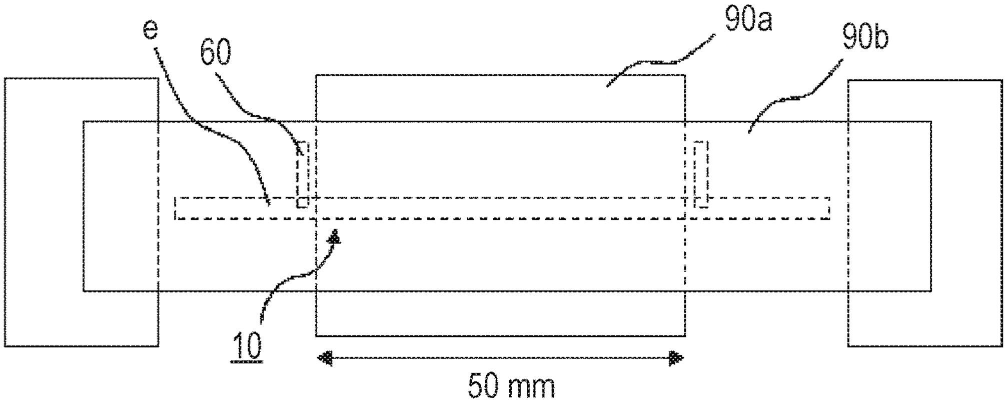
FIG. 9A is a schematic plan view of an article of Example 1 and an evaluation method.
Figure 9B:
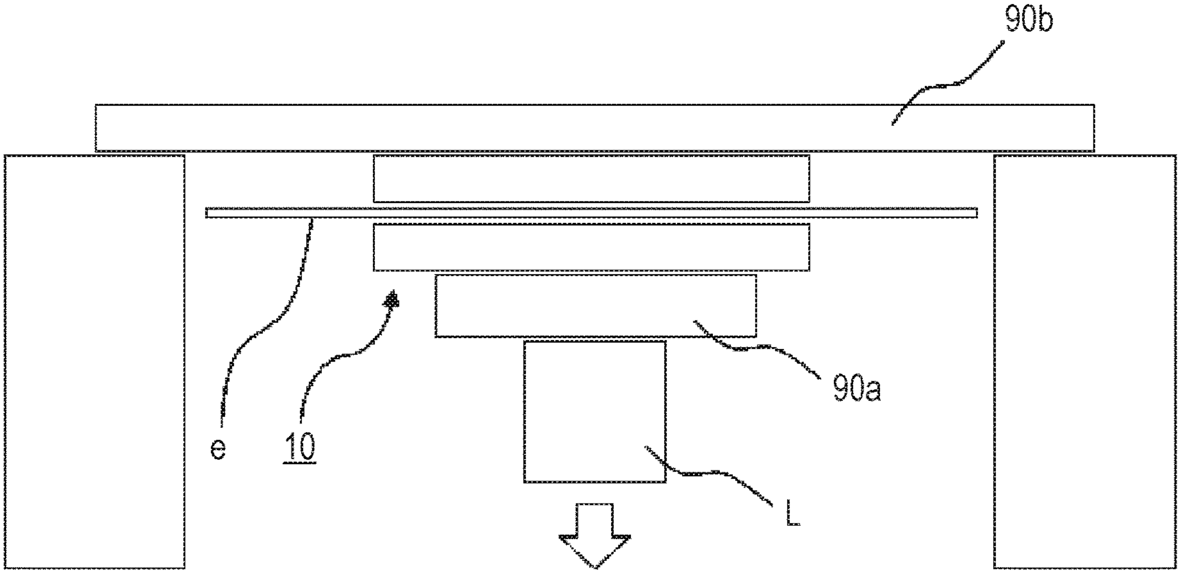
FIG. 9B is a schematic front view of the article of Example 1 and the evaluation method.
Figure 9C:
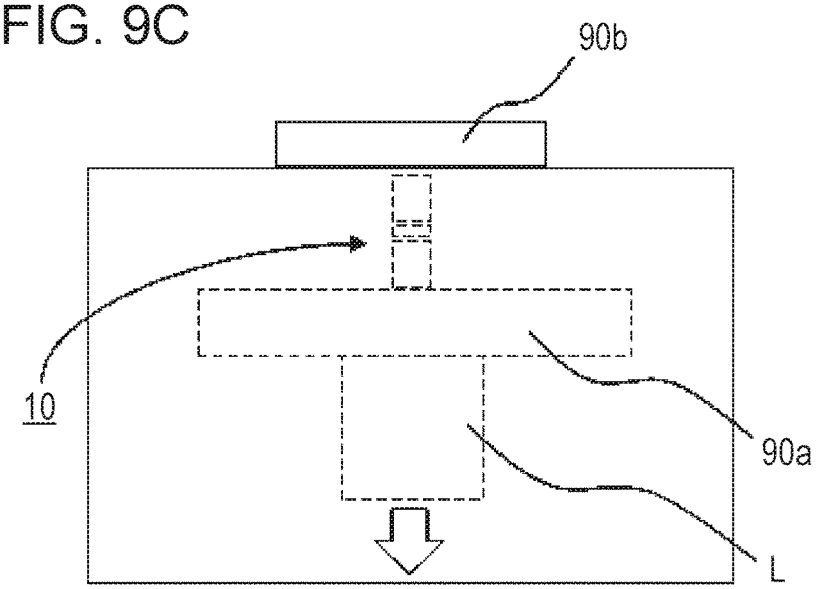
FIG. 9C is a schematic side view of the article of Example 1 and the evaluation method.

The release liner closer to the adhesive agent layer a1 of the sticky tape of Example 1 (denoted by reference numeral 10 in FIGS. 9A to 9C) was removed, and the sticky tape was bonded to an adherend 90*a* (glass, 40 mm in width×50 mm length×10 mm in thickness) such that the length of 50 mm of the tape adhesive surface (effective portion) crossed the center of the adherend 90*a* in the length direction of the adherend 90*a* (see FIGS. 9A to 9C). Next, the release liner on the adhesive agent layer a2 side was removed, and the sticky tape 10 was bonded to an adherend 90*b* (glass, 30 mm in width×100 mm in length×2.8 mm in thickness) in a sandwich manner (see FIGS. 9A to 9C) and was pressure-bonded at 20 N/$cm^2$ for 10 seconds. The resulting bonded product was allowed to stand in an atmosphere of 23° C. and 50% RH for 24 hours or more to produce an article of Example 1.

Reference Example 1

A sticky tape of Reference Example 1 with a total thickness of 110 μm was produced in the same manner as in Example 1 except that the laminate (T-2) was not bonded, and only the intermediate layer (A-1) was used as the sticky tape of Reference Example 1. The sticky tape of Reference Example 1 was a laminate with a layer structure of adhesive agent layer a1/heating element b/adhesive agent layer a2 stacked in this order except the release liner. An article of Reference Example 1 was produced in the same manner as in Example 1 except that the sticky tape of Reference Example 1 was used instead of the sticky tape of Example 1. In the article, an adherend (glass, 40 mm in width×50 mm in length×10 mm in thickness)/adhesive agent layer a1/heating element b/adhesive agent layer a2/adherend (glass, 30 mm in width×100 mm in length×2.8 mm in thickness) were stacked in this order.

Example 2

A sticky tape with a total thickness of 410 μm and an article of Example 2 were produced in the same manner as in Example 1 except that a 10-μm-thick stainless steel foil with a volume resistivity of 72.0 μΩ·cm as a catalog value and 79.9 μΩ·cm as a measured value (trade name: "stainless steel SUS304-H", manufactured by Takeuchi Metal Foil & Powder Co., Ltd.) was used instead of the nichrome foil to form the intermediate layer A. The intermediate layer A in Example 2 is referred to as an intermediate layer (A-2).

Example 3

A sticky tape with a total thickness of 410 μm and an article of Example 3 were produced in the same manner as in Example 1 except that a 10-μm-thick stainless steel foil with a volume resistivity of 60.0 μΩ·cm as a catalog value and 62.0 μΩ·cm as a measured value (trade name: "stainless steel SUS430-H", manufactured by Takeuchi Metal Foil & Powder Co., Ltd.) was used instead of the nichrome foil to form the intermediate layer A. The intermediate layer A formed in Example 3 is referred to as an intermediate layer (A-3).

Example 4

A sticky tape with a total thickness of 410 μm and an article of Example 4 were produced in the same manner as in Example 1 except that a 10-μm-thick titanium foil with a volume resistivity of 55.0 μΩ·cm as a catalog value and 51.8 μΩ·cm as a measured value (trade name: "titanium type 1 TR270C-H", manufactured by Takeuchi Metal Foil & Powder Co., Ltd.) was used instead of the nichrome foil to form the intermediate layer A. The intermediate layer A in Example 4 is referred to as an intermediate layer (A-4).

Example 5

7.5 g of an amphoteric surfactant (trade name: "Obazolin CAB-30", manufactured by Toho Chemical Industry Co., Ltd.) and 7.6 g of carbon nanotube (trade name: "NC7000", manufactured by Nanocyl) were mixed in 500 ml of water to prepare an aqueous solution. The aqueous solution was put into a ball mill body (volume=900 ml, ball mill diameter=130 mm, amount of balls=1600 g) and was lightly used to form a paste. The ball mill body was stirred for 2 hours on a rotation stand. The total amount of the resulting liquid dispersion was taken out from the ball mill body, and 250 ml of a 15% aqueous solution of the amphoteric surfactant was added to the liquid dispersion. The liquid dispersion was charged in a bead mill (trade name: "Dyno-Mill ECM-AP2", manufactured by WAB, internal volume=1900 ml, filled with 1800 g of zirconia beads with a diameter of 0.6 mm) and was stirred at a rotational speed of 300 rpm for 60 minutes to prepare an aqueous dispersion of carbon nanotube containing the amphoteric surfactant (concentration of carbon nanotube=0.99% by weight).

The aqueous dispersion of carbon nanotube was applied with a bar coater to one surface of a 25-μm-thick polyimide film (trade name: "Kapton 100H", manufactured by Du Pont-Toray Co., Ltd.) to a dry thickness of 3 μm. The coating film was dried at 100° C. for 10 minutes to form a carbon nanotube layer on one surface of the polyimide film. Thus, a carbon nanotube coated film was formed. The carbon nanotube layer had a measured volume resistivity of 19270 μΩ·cm.

A sticky tape with a total thickness of 428 μm and an article of Example 5 were produced in the same manner as in Example 1 except that the carbon nanotube coated film was used instead of the nichrome foil of Example 1. In the carbon nanotube coated film, the carbon nanotube layer was placed close to and bonded to the adhesive agent layer a1. The intermediate layer A in Example 5 is referred to as an intermediate layer (A-5).

Example 6

A sticky tape with a total thickness of 425 μm and an article of Example 6 were produced in the same manner as in Example 1 except that a metallic non-woven fabric (material: SUS316L, thickness: 25 μm, density: 1.6 g/cm$^3$, fiber diameter: 7 μm, measured volume resistivity: 783 μΩ·cm) was used instead of the nichrome foil to form the intermediate layer A. The intermediate layer A in Example 6 is referred to as an intermediate layer (A-6).

Example 7

<Preparation of Sticky Tape>

A crystalline polyester resin coating material (trade name: "Nichigo-POLYESTER MSP-640", manufactured by Mitsubishi Chemical Corporation, melting point: 100° C., molecular weight: 10,000, tack-free) (P-3) was applied to a release-treated surface of a release liner (a 75-μm-thick poly(ethylene terephthalate) film with one surface treated to be releasable) to a dry thickness of 50 μm, and was dried at 90° C. for 3 minutes to form a melt-softening layer c.

In the same manner as in Example 1, the adhesive agent composition (P-2) was applied to a release liner and was dried to form two adhesive agent layers each having a thickness of 50 μm. One was used as the adhesive agent layer a1, and the other was used as the adhesive agent layer a2. Next, the melt-softening layer c with a length of 50 mm cut to an arbitrary width and a nichrome foil with a length of 100 mm were bonded together using a hand roller such that the nichrome foil were extended by 25 mm at each end in the length direction, and was pressed with a roller at 120° C. and at a linear pressure of 5 kg/cm. Next, the adhesive agent layer a1 with a length of 50 mm cut to an arbitrary width was bonded to a surface of the melt-softening layer c from which the release liner was removed. Furthermore, the adhesive agent layer a2 with a length of 50 mm cut to an arbitrary width was bonded to a surface of the nichrome foil opposite the melt-softening layer c and the adhesive agent layer a1 and was pressed from the upper surface of the release liner with a roller at a linear pressure of 5 kg/cm. Each end of the nichrome foil was extended by 25 mm from the outer periphery of the melt-softening layer c and the adhesive agent layers a1 and a2 in the length direction of the nichrome foil. A laminate thus prepared had a total thickness of 160 μm excluding the release liner and had a layer structure of adhesive agent layer a1/melt-softening layer c/nichrome foil/adhesive agent layer a2 stacked in this order excluding the release liner. The laminate was aged in a 40° C. environment for 48 hours and was then cut to a width of 2 mm to form an intermediate layer (A-7). In the intermediate layer (A-7), the melt-softening layer c and the adhesive agent layers a1 and a2 had a size of 2 mm in width×50 mm in length, the nichrome foil had a size of 2 mm×100 mm in length, and the nichrome foil had a pair of extended portions extending from the outer periphery of the melt-softening layer c and the adhesive agent layers a1 and a2.

Two laminates (T-2) produced in Example 1 cut to a length of 50 mm and an arbitrary width were prepared. The intermediate layer (A-7) was placed between the two laminates (T-2) such that the foam layer was in contact with both surfaces of the intermediate layer (A-7), and they were bonded together such that the end portions of the melt-softening layer c and the adhesive agent layers a1 and a2 coincided with the end portions of the two laminates (T-2). The two laminates (T-2) were bonded to the intermediate layer A (A-7) from the upper surface of the release liner using a roller at a linear pressure of 5 kg/cm to produce a sticky tape with a total thickness of 460 μm of Example 7.

In the sticky tape of Example 7, the layer structure excluding the release liner is a laminate of adhesive agent layer B1/heat-insulating layer C/adhesive agent layer a1/melt-softening layer c/heating element b/adhesive agent layer a2/heat-insulating layer C/adhesive agent layer B1 stacked in this order, the melt-softening layer c is formed of a hot-melt adhesive agent, and the adhesive agent layers a1 and a2 and the adhesive agent layer B1 are formed of a pressure-sensitive adhesive agent. In the sticky tape of Example 7, the size (effective portion) of the adhesive surface was 2 mm in width×50 mm in length, the size of the nichrome foil was 2 mm in width×100 mm in length, and each end of the nichrome foil was extended from the outer periphery of the melt-softening layer c and the adhesive agent layers a1 and a2. The volume resistivity of the nichrome foil was 108 μΩ·cm as a catalog value and 105 μΩ·cm as a measured value.

<Preparation of Article>

The release liner closer to the melt-softening layer c of the sticky tape of Example 7 (denoted by reference numeral 10 in FIGS. 9A to 9C) was removed, and the sticky tape was bonded to an adherend 90*a* (glass, 40 mm in width×50 mm length×10 mm in thickness) such that the length of 50 mm of the tape adhesive surface (effective portion) crossed the center of the adherend 90*a* in the length direction of the adherend 90*a* (see FIGS. 9A to 9C). Next, the release liner on the opposite side of the sticky tape was removed, and the sticky tape 10 was bonded to an adherend 90*b* (glass, 30 mm in width×100 mm in length×2.8 mm in thickness) in a sandwich manner (see FIG. 9A to 9C) and was pressure-bonded at 20 N/cm$^2$ for 10 seconds. The resulting bonded product was allowed to stand in an atmosphere of 23° C. and 50% RH for 24 hours or more to produce an article of Example 7.

Reference Examples 2 to 7

Sticky tapes of Reference Examples 2 to 7 were produced in the same manner as in Examples 2 to 7 except that the laminate (T-2) was not bonded to both surfaces of the intermediate layer A. In the sticky tapes of Reference Examples 2 to 7, the structure excluding the release liner was only the intermediate layers (A-2) to (A-7), the total thickness of the sticky tape in Reference Examples 2 to 4 was 110 μm, the total thickness of the sticky tape of Reference Example 5 was 128 μm, the total thickness of the sticky tape of Reference Example 6 was 125 μm, and the total thickness of the sticky tape of Reference Example 7 was 160 μm.

Articles of Reference Examples 2 to 7 were produced in the same manner as in Examples 2 to 7 except that the sticky tapes of Reference Examples 2 to 7 were used instead of the sticky tapes of Examples 2 to 7.

<Evaluation>

<<Separation Time>>

The articles of Examples 1 to 7 (excluding Example 5) and Reference Examples 1 to 7 (excluding Reference Example 5) were used as test specimens. A load L of 500 g/cm$^2$ was set in the direction of the arrow shown in FIGS. 9B to 9C. In a 23° C. environment, the extended portions e of the metal foil (heating element) in the sticky tape 10 of each test specimen were held with an alligator clip 60, and an electric current was applied to the test specimen using a dry cell and a resistor (trade name: "metal clad resistor", manufactured by uxcell) such that the amount of heat generated per second was 37 J. The time (separation time) for the intermediate layer A to be separated, for the adherend 90*a* to drop, and for the article to be disassembled was measured. In the evaluation of the articles of Example 5 and Reference Example 5, a stabilized DC power supply (trade name: "PAS160-1" manufactured by Kikusui Electronics Corporation) was used instead of the dry cell to apply an electric current to the test specimen such that the amount of heat generated per second was 5.4 J, and the time (separation time) for the intermediate layer A to be separated, for the adherend 90*a* to drop, and for the article to be disassembled was measured. Table 1 shows the results. In Examples 1 to 5 and Reference Examples 1 to 5, separation occurred in the adhesive agent layer a1 of the intermediate layer A. In Example 6 and Reference Example 6, separation occurred at the interface between the adhesive agent layer a1 of the intermediate layer A and the metallic non-woven fabric. In Example 7 and Reference Example 7, separation occurred in the melt-softening layer c of the intermediate layer A.

<<Heat-Insulating Properties: Temperature of Adherend>>

In the measurement of the separation time in Examples 1 to 7 (excluding Example 5) and Reference Examples 1 to 7 (excluding Reference Example 5), the temperature of the adherend was measured over time, and the maximum attained temperature of the adherend at the time of disassembly was measured. The temperature of the adherend was measured with a film type temperature sensor (device name: ST-50 (K thermocouple), manufactured by RKC Instrument Inc.) and a recorder (device name: midi LOGGER GL200A, manufactured by Graphtec Corporation). The film type temperature sensor was placed on the surface (opposite the tape) of the adherend (glass, 30 mm in width×100 mm in length×2.8 mm in thickness). The metal foil at each end portion of the tape adhesive surface of the test specimen was held with an alligator clip, and an electric current was applied to the test specimen using a dry cell and the resistor (trade name: "metal clad resistor", manufactured by uxcell) such that the amount of heat generated per second was 37 J. The temperature of the adherend at the time of disassembly was measured. In the evaluation of the articles of Example 5 and Reference Example 5, the stabilized DC power supply (trade name: "PAS160-1", manufactured by Kikusui Electronics Corporation) was used instead of the dry cell to apply an electric current to each test specimen such that the amount of heat generated per second was 5.4 J, and the temperature of the adherend at the time of disassembly was measured. Table 1 shows the results.

TABLE 1

| | Heating element | Volume resistivity catalog value [μΩ · cm] | Volume resistivity measured value [μΩ · cm] | Presence of heat-insulating layer C | Presence of melt-softening layer c | Structure (embodiment) of intermediate layer A | Separation time [seconds] | Temperature of adherend [° C.] |
|---|---|---|---|---|---|---|---|---|
| Example 1 | Nichrome foil NCH1-H | 108 | 105 | Yes (two layers) | No | Embodiment 1 | 1 | 24 |
| Example 2 | Steel sheet foil SUS304-H | 72.0 | 79.9 | Yes (two layers) | No | Embodiment 1 | 2 | 26 |
| Example 3 | Steel sheet foil SUS430-H | 60.0 | 62.0 | Yes (two layers) | No | Embodiment 1 | 2 | 26 |
| Example 4 | Titanium foil TR270C-H | 55.0 | 51.8 | Yes (two layers) | No | Embodiment 1 | 3 | 28 |
| Example 5 | Carbon nanotube coated film | — | 19270 | Yes (two layers) | No | Embodiment 1 | 6 | 30 |
| Example 6 | Metallic non-woven fabric | — | 783 | Yes (two layers) | No | Embodiment 1 | 1 | 24 |

TABLE 1-continued

| | Heating element | Volume resistivity catalog value [μΩ · cm] | Volume resistivity measured value [μΩ · cm] | Presence of heat-insulating layer C | Presence of melt-softening layer c | Structure (embodiment) of intermediate layer A | Separation time [seconds] | Temperature of adherend [° C.] |
|---|---|---|---|---|---|---|---|---|
| Example 7 | Nichrome foil NCH1-H | 108 | 105 | Yes (two layers) | Yes | Embodiment 2 | 1 | 24 |
| Reference Example 1 | Nichrome foil NCH1-H | 108 | 105 | No | No | Embodiment 1 | 117 | 71 |
| Reference Example 2 | Steel sheet foil SUS304-H | 72.0 | 79.9 | No | No | Embodiment 1 | 126 | 73 |
| Reference Example 3 | Steel sheet foil SUS430-H | 60.0 | 62.0 | No | No | Embodiment 1 | 122 | 72 |
| Reference Example 4 | Titanium foil TR270C-H | 55.0 | 51.8 | No | No | Embodiment 1 | 132 | 75 |
| Reference Example 5 | Carbon nanotube coated film | — | 19270 | No | No | Embodiment 1 | 154 | 76 |
| Reference Example 6 | Metallic non-woven fabric | — | 783 | Yes (two layers) | No | Embodiment 1 | 18 | 45 |
| Reference Example 7 | Nichrome foil NCH1-H | 108 | 105 | No | Yes | Embodiment 2 | 121 | 72 |

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

REFERENCE SIGNS LIST

A intermediate layer
a1, a2, a3 adhesive agent layer
b heating element
c melt-softening layer
e extended portion (of heating element)
B, B1, B2 adhesive agent layer
C, C1, C2 heat-insulating layer
10, 20, 30, 40, 50 sticky tape
90 adherend
100 article
60 alligator clip
L load

The invention claimed is:

1. A sticky tape separable by heating, comprising:
an intermediate layer A containing a heating element and an adhesive agent;
an adhesive agent layer B1 disposed on a first surface of the intermediate layer A, wherein the adhesive agent layer B1 contains an adhesive agent; and
an adhesive agent layer B2 disposed on a second surface of the intermediate layer A, wherein the adhesive agent layer B2 contains an adhesive agent,
wherein at least one of the adhesive agent layer B1 and the adhesive agent layer B2 has heat-insulating properties, or
a heat-insulating layer C having heat-insulating properties is further provided at least one of between the intermediate layer A and the adhesive agent layer B1 and between the intermediate layer A and the adhesive agent layer B2.

2. The sticky tape according to claim 1, wherein the heat-insulating layer C is provided both between the intermediate layer A and the adhesive agent layer B1 and between the intermediate layer A and the adhesive agent layer B2.

3. The sticky tape according to claim 1, wherein the heat-insulating layer C is selected from the group consisting of a foam layer, a hollow-containing layer, and a hollow-particle-containing layer.

4. The sticky tape according to claim 1, wherein the heat-insulating layer C has a thickness in a range of 15 μm to 1,000 μm.

5. The sticky tape according to claim 1, wherein the heating element has a volume resistivity of 30μΩ·cm or more.

6. The sticky tape according to claim 5, wherein the heating element is selected from the group consisting of nichrome, stainless steel, titanium, nickel silver, and carbon.

7. The sticky tape according to claim 1, wherein the intermediate layer A is a laminate including:
the heating element that is a planar-shaped heating element; and
an adhesive agent layer a1 that is disposed on a first surface of the planar-shaped heating element and an adhesive agent layer a2 that is disposed on a second surface of the planar-shaped heating element.

8. The sticky tape according to claim 7, wherein the planar-shaped heating element has a pair of extended portions extending from an outer periphery of the adhesive agent layer a1 and the adhesive agent layer a2 in a plan view.

9. The sticky tape according to claim 7, wherein at least one of the adhesive agent layer a1 and the adhesive agent layer a2 is softened or melted by heating.

10. The sticky tape according to claim 1, wherein the intermediate layer A is composed of a single layer containing the heating element and the adhesive agent.

11. The sticky tape according to claim 1, wherein the intermediate layer A is softened or melted by heating.

12. The sticky tape according to claim 1, wherein a temperature at which a loss tangent (tan δ) of an adhesive agent layer formed of the adhesive agent of 0.45 or more is present in a temperature range of 80° C. or more and 200° C. or less.

13. An article comprising:
at least two adherends; and
the sticky tape according to claim 1 that is between the at least two adherends,
wherein the at least two adherends are bonded together via the sticky tape.

14. The article according to claim 13, wherein the sticky tape has a pair of extended portions extending from an outer periphery of the adherend in a plan view.

15. A method for disassembling the article according to claim 13, comprising:

softening or melting the intermediate layer A by heating of the heating element to separate the at least two adherends.

16. The method for disassembling the article according to claim 15, wherein the heating of the heating element is resistance heating, and the intermediate layer A is electrically connected to a power supply, the heating element is energized from the power supply, and the intermediate layer A is softened or melted by resistance heating to separate the at least two adherends.

* * * * *